(12) United States Patent
Nakamura et al.

(10) Patent No.: US 11,525,074 B2
(45) Date of Patent: Dec. 13, 2022

(54) TWO-COMPONENT CURING ADHESIVE, LAMINATED FILM, LAMINATED FILM-MANUFACTURING APPARATUS, AND METHOD FOR MANUFACTURING LAMINATED FILM

(71) Applicant: DIC Corporation, Tokyo (JP)

(72) Inventors: Kenji Nakamura, Sakura (JP); Atsumi Sano, Tokyo (JP); Tomoo Okubo, Tokyo (JP); Masahiro Niwa, Tokyo (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/601,513

(22) PCT Filed: Feb. 15, 2021

(86) PCT No.: PCT/JP2021/005515
§ 371 (c)(1),
(2) Date: Oct. 5, 2021

(87) PCT Pub. No.: WO2022/172448
PCT Pub. Date: Aug. 18, 2022

(65) Prior Publication Data
US 2022/0259472 A1    Aug. 18, 2022

(51) Int. Cl.
*C09J 175/08*    (2006.01)
*B32B 37/12*    (2006.01)
(Continued)

(52) U.S. Cl.
CPC .............. *C09J 175/08* (2013.01); *B32B 7/12* (2013.01); *B32B 27/08* (2013.01); *B32B 27/16* (2013.01);
(Continued)

(58) Field of Classification Search
CPC .......... C09J 175/08; B32B 7/12; B32B 27/08; B32B 27/16; B32B 27/36; B32B 37/1284;
(Continued)

(56) References Cited

U.S. PATENT DOCUMENTS

2018/0118982 A1    5/2018  Campell et al.
2019/0284457 A1*   9/2019  Nakamura ......... C08G 18/5021

FOREIGN PATENT DOCUMENTS

EP    3508437 A1    7/2019
JP    2000-509425 A  7/2000
(Continued)

OTHER PUBLICATIONS

International Search Report dated Apr. 6, 2021, issued in counterpart Application No. PCT/JP2021/005515, with English Translation. (4 pages).
(Continued)

*Primary Examiner* — Frances Tischler
(74) *Attorney, Agent, or Firm* — WHDA, LLP

(57) ABSTRACT

A two-component curing adhesive using a curing reaction between a polyisocyanate composition (X) and a polyol composition (Y), wherein the polyisocyanate composition (X) includes a polyisocyanate (A), the polyol composition (Y) includes a polyol (B) and a polyamine (C), the polyamine (C) includes a compound having two or more —NH$_2$ groups in a molecule thereof, and the polyisocyanate composition (X) and the polyol composition (Y) each have an elongational viscosity of 0.1 to 10 Pa·s.

12 Claims, 3 Drawing Sheets

(51) Int. Cl.
  *B32B 7/12* (2006.01)
  *B32B 27/16* (2006.01)
  *B32B 27/36* (2006.01)
  *B32B 27/08* (2006.01)
  *B32B 27/32* (2006.01)

(52) U.S. Cl.
  CPC .............. *B32B 27/32* (2013.01); *B32B 27/36* (2013.01); *B32B 37/1284* (2013.01); *B32B 2255/10* (2013.01); *B32B 2255/205* (2013.01); *B32B 2255/26* (2013.01); *B32B 2323/10* (2013.01); *B32B 2367/00* (2013.01)

(58) Field of Classification Search
  CPC .......... B32B 2255/10; B32B 2255/205; B32B 2255/26; B32B 2323/10; B32B 2367/00

See application file for complete search history.

(56) References Cited

FOREIGN PATENT DOCUMENTS

| | | |
|---|---|---|
| JP | 2003-171641 A | 6/2003 |
| JP | 2003-171642 A | 6/2003 |
| JP | 2003-171643 A | 6/2003 |
| JP | 2018-30905 A | 3/2018 |
| JP | 2018-520218 A | 7/2018 |
| JP | 2019-533034 A | 11/2019 |
| WO | 97/43352 A1 | 11/1997 |
| WO | 2016/178871 A1 | 11/2016 |
| WO | 2018/043469 A1 | 3/2018 |
| WO | 2018/043470 A1 | 3/2018 |
| WO | 2018/059544 A1 | 4/2018 |

OTHER PUBLICATIONS

Written Opinion dated Apr. 6, 2021, issued in counterpart Application No. PCT/JP2021/005515, with English Translation. (7 pages).
Non-Final Office Action dated Jul. 6, 2022, issued in U.S. Appl. No. 17/601,502 (14 pages).

* cited by examiner

TWO-COMPONENT CURING ADHESIVE, LAMINATED FILM, LAMINATED FILM-MANUFACTURING APPARATUS, AND METHOD FOR MANUFACTURING LAMINATED FILM

TECHNICAL FIELD

The present invention relates to a two-component curing adhesive, a laminated film, a laminated film-manufacturing apparatus, and a method for manufacturing a laminated film.

BACKGROUND ART

In some of laminated films each composed of two films bonded to each other with an adhesive, a two-component curing adhesive using a curing reaction between a polyisocyanate composition and a polyol composition has been used as the adhesive.

As methods for manufacturing a laminated film by using a two-component curing adhesive, there are a method including a two-component mixing application process that has been used for a long time and a method including a two-component separate application process that has been attracting attention in recent years.

In the method including a two-component mixing application process, a method including a two-component mixing application process of mixing a polyisocyanate composition and a polyol composition to prepare a mixture solution and applying this mixture solution onto a film and an adhesive layer forming process of bonding another film on the coated film formed on the above film and performing curing is used.

As the method including a two-component separate application process, there is a method including a two-component separate application process consisting of a first application step of applying a polyisocyanate composition to a first film and a second application step of applying a polyol composition to a second film and an adhesive layer forming process of bring the polyisocyanate composition applied on the first film and the polyol composition applied on the second film into contact with each other by laminating the first film and the second film to cause a curing reaction.

Recently, from the viewpoint of reducing the environmental loading and improving the working environment, a demand for a solvent-free two-component curing adhesive not using an organic solvent is increasing.

For example, PTLs 1 to 3 describe two-component separate application-type adhesives that start a curing reaction when a solvent-free agent A in a liquid form at ordinary temperature applied to one adherend and a solvent-free agent B in a liquid from at ordinary temperature applied to the other adherend come into contact with each other.

PTL 1 describes a two-component separate application-type urethane-based adhesive containing the agent A that is mainly composed of a compound having isocyanate groups at both ends of the molecule and the agent B that is composed of a compound having amino groups at both ends of the molecule, a compound having a tertiary amine in the molecule, and a tackifier resin.

PTL 2 describes a two-component separate application-type urethane-based adhesive composed of the agent A that is mainly composed of a compound having isocyanate groups at both ends of the molecule and the agent B that is mainly composed of a compound having amino groups at both ends of the molecule.

PTL 3 describes a two-component separate application-type urethane-based adhesive in which the agent A is mainly composed of a compound having isocyanate groups at both ends of the molecule and the agent B is mainly composed of a compound having a hydroxy group in the molecule.

CITATION LIST

Patent Literature

PTL 1: Japanese Unexamined Patent Application Publication (Translation of PCT Application) No. 2003-171641
PTL 2: Japanese Unexamined Patent Application Publication (Translation of PCT Application) No. 2003-171642
PTL 3: Japanese Unexamined Patent Application Publication (Translation of PCT Application) No. 2003-171643

SUMMARY OF INVENTION

Technical Problem

However, when a laminated film is manufactured using a two-component curing adhesive using a curing reaction between a polyisocyanate composition and a polyol composition, the cohesive force (initial cohesive force) immediately after the adhesion is insufficient in some cases. In such a case, since it takes time to obtain a sufficient cohesive force, the time for the aging process may get longer, or warming at about 40° C. to 60° C. may be needed. Accordingly, there is a risk of reducing the production efficiency of the laminated film. In particular, in many of the methods including a two-component separate application process, a polyisocyanate composition and a polyol composition are applied to substrates, respectively, and are then brought into contact with each other between the substrates for the first time. Consequently, the mixing of the compositions and the reaction between functional groups in the compositions gently proceed, and insufficient initial cohesive force is often a problem.

When a laminated film is manufactured using a two component curing adhesive, there is a disadvantage of being likely to cause misting (stringing phenomenon). If misting occurs, since the adhesive is likely to be scattered and adhere to the manufacturing apparatus or facility, for example, regular suspension of operations and cleaning are necessary. On the other hand, if the rotation speed of a roller and the transport speed of a film are decreased for reducing the occurrence of misting, the production efficiency is decreased. In particular, when a laminated film is continuously manufactured using a method including a two-component separate application process, misting of the two-component curing adhesive is likely to occur by increasing the transport speed of the film, resulting in a problem.

The present invention was made in view of the above circumferences, and it is an object thereof to provide a two-component curing adhesive using a curing reaction between a polyisocyanate composition and a polyol composition and having excellent initial cohesive force and being unlikely to cause misting even if subjected to a step of application onto a film.

It is an object of the present invention to provide a laminated film having excellent characteristics and capable of being efficiently manufactured using a two-component curing adhesive that uses a curing reaction between a polyisocyanate composition and a polyol composition and is unlikely to cause misting even if subjected to a step of application onto a film and has excellent initial cohesive force.

It is an object of the present invention to provide a laminated film-manufacturing apparatus that can be suitably used when a laminated film is manufactured by a method including a two-component separate application process using a two-component curing adhesive that uses a curing reaction between a polyisocyanate composition and a polyol composition and is unlikely to cause misting and has excellent initial cohesive force.

It is an object of the present invention to provide a method for manufacturing a laminated film that can efficiently manufacture a laminated film by using a two-component curing adhesive that uses a curing reaction between a polyisocyanate composition and a polyol composition and is unlikely to cause misting and has excellent initial cohesive force.

Solution to Problem

In order to solve the above problems, the present inventors have made extensive studies for enhancing the initial cohesive force when using a two-component curing adhesive that uses a curing reaction between a polyisocyanate composition and a polyol composition while suppressing occurrence of misting in a step of application onto a film.

As a result, it was found that the initial cohesive force is improved and occurrence of misting can be suppressed by using a polyisocyanate composition and a polyol composition each having an elongational viscosity of 0.1 to 10 Pa-n, and the present inventors arrived at the present invention.

That is, the present invention relates to the following aspects:

[1] A two-component curing adhesive using a curing reaction between a polyisocyanate composition (X) and a polyol composition (Y), wherein
the polyisocyanate composition (X) includes a polyisocyanate (A),
the polyol composition (Y) includes a polyol (B), and
the polyisocyanate composition (X) and the polyol composition (Y) each have an elongational viscosity of 0.1 to 10 Pa·s;

[2] A laminated film including an adhesive layer between a first film and a second film, wherein
the adhesive layer is made of a cured product of the two-component curing adhesive according to aspect [1];

[3] A laminated film-manufacturing apparatus including:
a first coating unit for applying a polyisocyanate composition (X) including a polyisocyanate (A) and having an elongational viscosity of 0.1 to 10 Pa·s to a first film;
a second coating unit for applying a polyol composition (Y) including a polyol (B) and having an elongational viscosity of 0.1 to 10 Pa·s to a second film; and
a bonding device for bonding the polyisocyanate composition (X)-coated surface of the first film and the polyol composition (Y)-coated surface of the second film; and

[4] A method for manufacturing a laminated film, including:
a two-component separate application process composed of a first application step of applying a polyisocyanate composition (X) including a polyisocyanate (A) and having an elongational viscosity of 0.1 to 10 Pa·s to a first film, and
a second application step of applying a polyol composition (Y) including a polyol (B) and having an elongational viscosity of 0.1 to 10 Pa·s to a second film; and
an adhesive layer forming process of bringing the polyisocyanate composition (X) applied on the first film and the polyol composition (Y) applied on the second film into contact with each other by laminating the first film and the second film to cause a curing reaction.

Advantageous Effects of Invention

The two-component curing adhesive of the present invention is a two-component curing adhesive using a curing reaction between a polyisocyanate composition (X) having an elongational viscosity of 0.1 to 10 Pa·s and a polyol composition (Y) having an elongational viscosity of 0.1 to 10 Pa·s. In the two-component curing adhesive of the present invention, the polyisocyanate composition (X) and the polyol composition (Y) each have an elongational viscosity of 0.1 to 10 Pa·s, and the initial cohesive force is excellent. In addition, misting is unlikely to occur even if performing a step of application onto a film.

Consequently, the two-component curing adhesive of the present invention can be suitably used when manufacturing a laminated film by, for example, a manufacturing method including a two-component mixing application process or a manufacturing method including a two-component separate application process. In particular, the adhesive can be suitably used when a laminated film is continuously manufactured using a method including a two-component separate application process.

The laminated film of the present invention includes an adhesive layer between a first film and a second film, and the adhesive layer is made of a cured product of the two-component curing adhesive of the present invention. The two-component curing adhesive of the present invention is excellent in initial cohesive force and therefore can shorten the aging time in the process for manufacturing a laminated film or widen the range of choices in the process, resulting in efficient manufacturing. In addition, the laminated film of the present invention can be manufactured using the two-component curing adhesive of the present invention that is unlikely cause misting even if subjected to a step of application onto a film. Accordingly, the laminated film of the present invention can be efficiently manufactured using a manufacturing method, for example, a manufacturing method including a two-component mixing application process or a manufacturing method including a two-component separate application process.

The laminated film-manufacturing apparatus of the present invention applies a polyisocyanate composition (X) having an elongational viscosity of 0.1 to 10 Pa·s to a first film by a first coating unit and applies a polyol composition (Y) having an elongational viscosity of 0.1 to 10 Pa·s to a second film by a second coating unit. Consequently, the laminated film-manufacturing apparatus of the present invention can be suitably used when manufacturing a laminated film by a manufacturing method including a two-component separate application process using a two-component curing adhesive of the present invention.

The method for manufacturing a laminated film of the present invention includes a two-component separate application process and applies a polyisocyanate composition (X) having an elongational viscosity of 0.1 to 10 Pa·s to a first film in a first application step and applies a polyol composition (Y) having an elongational viscosity of 0.1 to 10 Pa·s to a second film in a second application step. Consequently, the method for manufacturing a laminated film of the present invention can manufacture a laminated film having excellent characteristics with high production efficiency by using the two-component curing adhesive of the present invention having excellent initial cohesive force. In addition, a laminated film can be continuously manufactured efficiently at a

DESCRIPTION OF EMBODIMENTS

Figure 1:
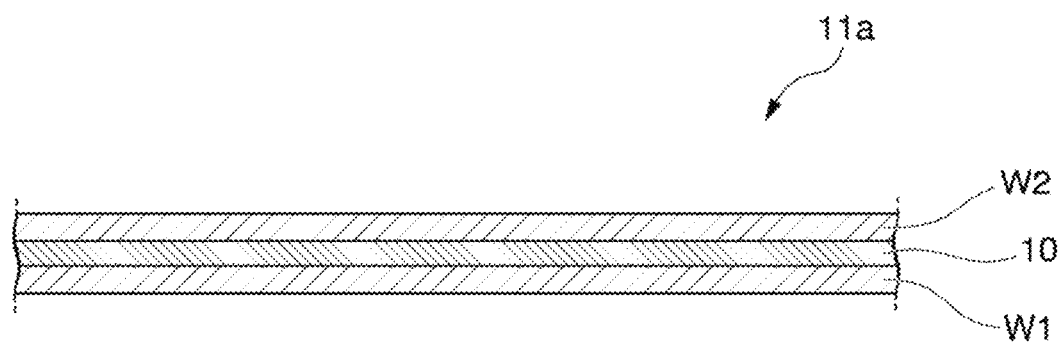
FIG. 1. is a cross-sectional view Showing an example of a laminated film according to the present embodiment.

The two-component curing adhesive, the laminated film, the laminated film-manufacturing apparatus, and the method for manufacturing a laminated film of the present invention will now be described in detail using the drawings. Incidentally, the drawings used in the following description may be enlarged to show the characteristic parts for convenience in order to make the characteristics of the present invention easy to understand. Accordingly, for example, the dimensional ratio of each component may differ from the actual one.

[Two-Component Curing Adhesive]

The two-component curing adhesive of the present embodiment is a two-component curing adhesive using a curing reaction between a polyisocyanate composition (X) and a polyol composition (Y).

The polyisocyanate composition (X) in the two-component curing adhesive of the present embodiment includes a polyisocyanate (A) and has an elongational viscosity of 0.1 to 10 Pa·s. The polyol composition (Y) includes a polyol (B) and has an elongational viscosity of 0.1 to 10 Pa·s. The polyisocyanate composition (X) may include a part of the polyol (B) included in the two-component curing adhesive as needed.

The two-component curing adhesive of the present embodiment cures by a chemical reaction between an isocyanate group in the polyisocyanate composition (X) and a hydroxy group (or a hydroxy group and an amino group) in the polyol composition (Y).

(Elongational Viscosity of Polyisocyanate Composition (X) and Polyol Composition (Y))

In the two-component curing adhesive of the present embodiment, the polyisocyanate composition (X) and the polyol composition (Y) each have an elongational viscosity of 0.1 to 10 Pa·s, and the initial cohesive force is excellent. When the elongational viscosities of the polyisocyanate composition (X) and the polyol composition (Y) are each 0.1 to 10 Pa·s, in the case of manufacturing a laminated film using the two-component curing adhesive of the present embodiment, misting (stringing phenomenon) is unlikely to occur even if a step of applying the polyisocyanate composition (X) and/or the polyol composition (Y) to a film is performed. Consequently, the two-component curing adhesive of the present embodiment can be suitably used particularly in manufacturing of a laminated film using a method including a two-component separate application process which is likely to cause misting.

In addition, the polyisocyanate composition (X) having an elongational viscosity of 0.1 to 10 Pa·s and the polyol composition (Y) having an elongational viscosity of 0.1 to 10 Pa·s has good reactivity. Accordingly, the aging temperature of the two-component curing adhesive can be lowered, the aging time can be shortened, and a laminated film having excellent characteristics can be manufactured with high production efficiency.

When a composition including a prepolymer described later is used, the elongational viscosity of the polyisocyanate composition (X) is preferably 3 Pa·s or more, more preferably 5 Pa·s or more, and further preferably 7 Pa·s or more.

The elongational viscosity of the polyol composition (Y) is preferably 7 Pa·s or less, more preferably 5 Pa·s or less, further preferably 3 Pa·s or less, and particularly preferably 2 Pa·s or less, because misting can be more effectively suppressed, and the reactivity with the polyisocyanate composition (X) is further increased to further improve the initial cohesive force. It is also preferable that the elongational viscosity of the polyol composition (Y) is 1 Pa·s or less.

The polyisocyanate composition (X) and the polyol composition (Y) are preferably applied onto a substrate using a roll coater or a gravure coater. From this, the polyisocyanate composition (X) and the polyol composition (Y) preferably each have a certain elongational viscosity, preferably an elongational viscosity of above 0.1 Pa·s and more preferably above 0.2 Pa·s.

In addition, when the workability of the two-component curing adhesive is particularly prioritized, the elongational viscosity of each of the polyisocyanate composition (X) and the polyol composition (Y) is preferably above 1 Pa·s.

The elongational viscosity of the polyisocyanate composition (X) can be controlled by adjusting the ratio of a low-viscosity material and a high-viscosity material included in the material (compound) used in the polyisocyanate composition (X).

Incidentally, the viscosity of a material (compound) that is used in the polyisocyanate composition (X) can be grasped by those skilled in the art. In addition, it is possible for those skilled in the art to obtain a polyisocyanate composition (X) having an elongational viscosity within a desired range by combining materials (compounds) that are used in the polyisocyanate composition (X) and appropriately adjusting the compounding ratio within the range of normal experiments based on a known technology.

The elongational viscosity of the polyol composition (Y) can be controlled by adjusting the ratio of a low-viscosity material and a high-viscosity material included in the material (compound) used in the polyol composition (Y).

Incidentally, the viscosity of a material (compound) that is used in the polyol composition (Y) can be grasped by those skilled in the art. In addition, it is possible for those skilled in the art to obtain a polyol composition (Y) having an elongational viscosity within a desired range by combining materials (compounds) that are used in the polyol composition (Y) and appropriately adjusting the compounding ratio within the range of normal experiments based on a known technology.

(Polyisocyanate (A))

As the polyisocyanate (A), a known polyisocyanate can be used without particular limitation.

Examples of the polyisocyanate (A) include:
aromatic polyisocyanates, such as tolylene diisocyanate, 2,4'-diphenylmethane diisocyanate (hereinafter, diphenylmethane diisocyanate may be simply mentioned as "MDI"), 2,2'-MDI, 4,4'-MDI, 1,5-naphthalene diisocyanate, and triphenylmethane triisocyanate;

aliphatic polyisocyanates, such as xylene diisocyanate, isophorone diisocyanate, 4,4'-methylenebis(cyclohexylisocyanate), 1,3-(isocyanatomethyl)cyclohexane, 1,6-hexamethylene diisocyanate, lysine diisocyanate, and trimethyl hexamethylene diisocyanate;

compounds in which some of the isocyanate groups of these polyisocyanates (hereinafter, may be referred to as "NCO group") are modified with carbodiimide;

isocyanurates derived from these polyisocyanates; allophanates derived from these polyisocyanates; biurets derived from these polyisocyanates; adducts obtained by modifying these polyisocyanates with tximethylolpropane; and polyisocyanates (A1) as reaction products (prepolymers) of various polyisocyanates and polyol components (hereinafter, the polyisocyanate as a prepolymer may be referred to as "polyisocyanate (A1)").

In the polyisocyanate (A1), examples of the polyol component that is reacted with an aromatic polyisocyanate or an aliphatic polyisocyanate specifically include chain aliphatic glycols, such as ethylene glycol, propylene glycol, 1,3-propanediol, 1,4-butanediol, 1,5-pentanediol, 3-methyl-1,5-pentanediol, 1,6-hexanediol, neopentyl glycol, methyl pentanediol, dimethyl butanediol, butyl ethyl propanediol, diethylene glycol, triethylene glycol, tetraethylene glycol, dipropylene glycol, tripropylene glycol, and bishydroxyethoxybenzene; alicyclic glycols, such as 1,4-cyclohexanediol and 1,4-cyclohexanedimethanol; trifunctional or tetrafunctional aliphatic alcohols, such as glycerol, trimethylolpropane, and pentaerythritol; bisphenols, such as bisphenol A, bisphenol F, hydrogenated bisphenol A, and hydrogenated bisphenol F; dimer diol; a polyether polyol obtained by addition polymerization of an alkylene oxide, such as ethylene oxide, propylene oxide, butylene oxide, styrene oxide, epichlorohydrin, tetrahydrofuran, or cyclohexylene, in the presence of a polymerization initiator, such as the glycol or the trifunctional or tetrafunctional aliphatic alcohol mentioned above; and a polyester polyol (1) that is a reaction product of a polyester obtained by a ring-opening polymerization reaction of a cyclic ester compound, such as propiolactone, butyrolactone, ε-caprolactone, σ-valerolactone, or β-methyl-σ-valerolactone, and the glycol or the trifunctional or tetrafunctional aliphatic alcohol mentioned above;

A polyester polyol (2) obtained by reacting a polyol, such as the above-mentioned chain aliphatic glycol, alicyclic glycol, dimer diol, bisphenol, or polyether polyol, and a polyvalent carboxylic acid;

a polyester polyol (3) obtained by reacting the above-mentioned trifunctional or tetrafunctional aliphatic alcohol and a polyvalent carboxylic acid;

a polyester polyol (4) obtained by reacting a polyol, such as the above-mentioned chain aliphatic glycol, alicyclic glycol, dimer diol, bisphenol, or polyether polyol, the above-mentioned trifunctional or tetrafunctional aliphatic alcohol, and a polyvalent carboxylic acid;

a polyester polyol (5) that is a polymer of a hydroxy acid, such as dimethylol propionic acid and castor oil fatty acid; and castor oil, dehydrated castor oil, hydrogenated castor oil, which is a hydrogen additive of castor oil, castor oil-based polyols such as a 5 to 50 mol alkylene oxide adduct of castor oil, and a mixture thereof.

Examples of the polyvalent carboxylic acid that is used for manufacturing the polyester polyol (2), (3), or (4) include acyclic aliphatic dicarboxylic acids, such as succinic acid, adipic acid, azelaic acid, sebacic acid, dodecanedicarboxylic acid, maleic anhydride, and fumaric acid; alicyclic dicarboxylic acids, such as 1,3-cyclopentanedicarboxylic acid and 1,4-cyclohexanedicarboxylic acid; aromatic dicarboxylic acids, such as terephthalic acid, isophthalic acid, phthalic acid, 1,4-naphthalene dicarboxylic acid, 2,5 naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid; anhydrides or ester-forming derivatives of these aliphatic or aromatic dicarboxylic acids; and polybasic acids, such as p-hydroxybenzoic acid, p-(2-hydroxyethoxy)benzoic acid, ester-forming derivatives of these dihydroxycarboxylic acids, and dimer acid.

Among these polyisocyanates (A), the polyisocyanates (A1) are preferable, in particular, polyisocyanate obtained by reacting the polyether polyol and the polyisocyanate is preferable from the viewpoint of wettability.

Furthermore, it is preferable to use a polyol having a polypropylene skeleton as the polyol component to be reacted with polyisocyanate, because the obtained polyisocyanate (A1) has a low viscosity and can be easily handled at low temperature.

From the viewpoint of flexibility of the coated film after curing of the polyisocyanate (A1), it is preferable to use a polyether polyol having a number average molecular weight (Mn) of 0.300 to 5,000, more preferably, 350 to 3,000, as the polyol component to be reacted with polyisocyanate.

The proportion of the polyether polyol having a number average molecular weight (Mn) of 300 to 5,000 in the polyol component is preferably 50 mass % or more as an example. The whole polyol component may be a polyether polyol having a number average molecular weight (Mn) of 300 to 5,000.

In the present specification, the weight average molecular weight (Mw) and the number average molecular weight (Mn) are values measured by gel permeation chromatography (GPC) under the following conditions:

Measurement apparatus: HLC-8320 GPC manufactured by TOSOH Corporation;

Column: TSKgeI 4000HXL, TSKgel 3000HXL, TSKgeI 2000HXL, and TSKgel 1000HXL manufactured by TOSOH Corporation;

Detector: RI (differential refractometer);

Data processing: Multistation GPC-8020 model II manufactured by TOSOH Corporation;

Measurement condition: column temperature of 40° C.

Solvent: tetrahydrofuran;

Flow rate: 0.35 mL/min;

Standard: monodisperse polystyrene; and

Sample: product (100 μL) obtained by filtrating a tetrahydrofuran solution of 0.2 mass % in terms of resin solid content through a microfilter.

In the polyisocyanate (A1), it is preferable to include an aromatic polyisocyanate as the polyisocyanate to be reacted with the polyol component, because of excellent reactivity with polyamine (C) described later. The amount of the aromatic polyisocyanate is, for example, preferably 30 parts by mass or more based on the total charged amount of 100 parts by mass at the time of synthesis of the polyisocyanate (A1), and more preferably 40 parts by mass or more. The upper limit of the amount of the aromatic polyisocyanate is preferably 60 parts by mass or less and more preferably 55 parts by mass or less from the viewpoint of storage stability.

As the polyisocyanate to be reacted with the polyol component, at least one of aliphatic polyisocyanates and derivatives of aliphatic polyisocyanates is preferably used in combination with an aromatic polyisocyanate from the viewpoint of storage stability.

The reaction ratio of the polyisocyanate and the polyol component in the polyisocyanate (A1) is preferably within a range of 1.5 to 5.0 as the equivalent ratio of the isocyanate group in the polyisocyanate and the hydroxy group in the polyol component [isocyanate group/hydroxy group]. A polyisocyanate composition (X) including the polyisocyanate (A) adopting such a polyisocyanate (A1) has a viscosity within an appropriate range and is preferable because the coating properties are improved, and the cohesive force of the coated film made of a two-component curing adhesive including the polyisocyanate (A) is improved.

The polyisocyanate (A) preferably has a weight average molecular weight (Mw) within a range of 100 to 10,000 from the viewpoint of ensuring proper packaging properties while shortening the aging time and more preferably within a range of 200 to 5,000.

When the polyisocyanate (A) is the polyisocyanate (A1), it is preferable that the weight average molecular weight (Mw) is within a range of 300 to 10,000.

The isocyanate content of the polyisocyanate (A) is preferably 5 to 20 mass %. A polyisocyanate composition (X) including such a polyisocyanate (A) is preferred from the viewpoint of a proper resin viscosity and excellent coating properties.

The isocyanate content of the polyisocyanate (A) is a value determined by a titration method using di-n-butylamine.

(Polyol (B))

Examples of the polyol (B) include glycols, such as ethylene glycol, propylene glycol, 1,3-propanediol, 1,4-butanediol, 1,5-pentanediol, 3-methyl-1,5-pentanediol, 1,6-hexanediol, neopentyl glycol, methyl pentanediol, dimethyl butanediol, butyl ethyl propanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, and triethylene glycol;

Trifunctional or tetrafunctional aliphatic alcohols, such as glycerol, trimethylolpropane, and pentaerythritol; bisphenols, such as bisphenol A, bisphenol F, hydrogenated bisphenol A, and hydrogenated bisphenol F; dimer diol; a polyether polyol obtained by addition polymerization of an alkylene oxide, such as ethylene oxide, propylene oxide, butylene oxide, styrene oxide, epichlorohydrin, tetrahydrofuran, or cyclohexylene, in the presence of a polymerization initiator, such as the glycol or the trifunctional or tetrafunctional aliphatic alcohol mentioned above; a polyether urethane polyol obtained by further increasing the molecular weight of the polyether polyol with the aromatic or aliphatic polyisocyanate; and a polyester polyol (1) that is a reaction product of a polyester obtained by a ring-opening polymerization reaction of a cyclic ester compound, such as propiolactone, butyrolactone, ε-caprolactone, σ-valerolactone, or β-methyl-σ-valerolactone, and the glycol or the trifunctional or tetrafunctional aliphatic alcohol mentioned above;

A polyester polyol (2) obtained by reacting a bifunctional polyol, such as the glycol, dimer diol, or bisphenol, and a polyvalent carboxylic acid;

a polyester polyol (3) obtained by reacting the trifunctional or tetrafunctional aliphatic alcohol mentioned above and a polyvalent carboxylic acid;

a polyester polyol (4) obtained by reacting a bifunctional polyol, the trifunctional or tetrafunctional aliphatic alcohol mentioned above, and a polyvalent carboxylic acid;

a polyester polyol (5) that is a polymer of a hydroxy acid, such as dimethylol propionic acid and castor oil fatty acid;

a polyester polyether polyol obtained by reacting any of the polyester polyols (1) to (5), the polyether polyol, and an aromatic or aliphatic polyisocyanate;

a polyester polyurethane polyol obtained by increasing the molecular weight of any of the polyester polyols (1) to (5) with an aromatic or aliphatic polyisocyanate; and castor oil, dehydrated castor oil, hydrogenated castor oil, which is a hydrogen additive of castor oil, castor oil-based polyol such as a 5 to 50 mol alkylene oxide adduct of castor oil, and a mixture thereof.

Examples of the polyvalent carboxylic acid that is used for manufacturing of the polyester polyol (2), (3), or (4) include aliphatic dicarboxylic acids, such as succinic acid, adipic acid, azelaic acid, sebacic acid, dodecanedicarboxylic acid, maleic anhydride, fumaric acid, 1,3-cyclopentanedicarboxylic acid, and 1,4-cyclohexanedicarboxylic acid; aromatic dicarboxylic acids, such as terephthalic acid, isophthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid; or ester-forming derivatives of these aliphatic or aromatic dicarboxylic acids; and polybasic acids, such as p-hydroxybenzoic acid, p-(2-hydroxyethoxy)benzoic acid, ester-forming derivatives of these dihydroxycarboxylic acids, and dimer acid.

As the polyol (B), a tertiary amine compound having multiple hydroxy groups may be used. The tertiary amine compound having multiple hydroxy groups not only cures by a reaction of the hydroxy groups with a polyisocyanate (A) but also promotes the curing reaction by the amine structure and therefore also functions as a curing accelerator.

In the tertiary amine compound having multiple hydroxy groups, the number of the hydroxy groups is two or more and is preferably two to six. The tertiary amine compound having multiple hydroxy groups may have one or more tertiary amino groups and preferably one or two.

Examples of the tertiary amine compound having multiple hydroxy groups include polypropylene glycol ethylenediamine ether, tri (1,2-polypropylene glycol)amine, N-ethyldiethanolamine, N-methyl-N-hydroxyethyl-N-hydroxyethoxyethylamine, pentakishydroxypropyldiethylenetriamine, tetrakishydroxypropylethylenediamine, N,N,N',N'-tetrakis(2-hydroxypropyl) ethylenediamine, triethanolamine, and triethanolamine propoxylated.

As the tertiary amine compound having multiple hydroxy groups, a commercially available product may be used. Examples of the commercially available product include EDP-300 manufactured by ADEKA Corporation, ED-500 and TE-360 manufactured by Kukdo Chemical Co., Ltd., and VORANOL™ 800 Polyol manufactured by DOW Chemical Company.

When the polyol (B) includes the tertiary amine compound having multiple hydroxy groups, the mixing ratio of the polyol other than the tertiary amine compound in the polyol (B) and the tertiary amine compound (polyol other than tertiary amine compound/tertiary amine compound (mass ratio)) is preferably 100/5 to 100/70 and more preferably 100/10 to 100/70.

As the polyol (B), these compounds can be used alone or in combination.

The polyol (B) preferably includes a polyol having a polyether skeleton, in particular, a polyol having a polypropylene skeleton. Such a polyol (B) has a viscosity that allows coating at a temperature of 25° C. to 60° C. even in a solvent-free type. A two-component curing adhesive including such a polyol (B) is preferable because it has excellent adhesion strength with a metal oxide such as silica and/or alumina, a metal such as aluminum, and a resin film.

The content of the polyol having a polyether skeleton is preferably 5 mass % or more, more preferably 10 mass % or more, and more preferably 15 mass % or more based on the total amount of the polyol (B) from the viewpoint of coatability. The upper limit of the content of the polyol having a polyether skeleton is not particularly limited, and the whole polyol (B) may be a polyol having a polyether skeleton, but the upper limit is preferably 95 mass % or less from the viewpoint of initial cohesive force of the two-component curing adhesive.

The polyol (B) preferably includes, from the viewpoint of the initial cohesive force and the coatability of the two-component curing adhesive, at least one castor oil-based compound selected from the group consisting of castor oil, dehydrated castor oil, hydrogenated castor oil, which is a hydrogen additive of castor oil, castor oil-based polyol such as a 5 to 50 mol alkylene oxide adduct of castor oil.

The content of these castor oil-based compounds is preferably 5 mass % or more, more preferably 10 mass % or more, more preferably 15 mass % or more, and more preferably 20 mass % or more based on the total amount of the polyol (B). The upper limit of the castor oil-based compound is not particularly limited, and the whole polyol (B) may be a castor oil-based compound, but the upper limit is preferably 95 mass % or less from the viewpoint of the coatability.

The polyol (B) may include a highly reactive low molecular weight polyol. (one that is a liquid at ordinary temperature and has a molecular weight of about 150 or less). The reaction with the polyisocyanate (A) can be quickened by including such a low molecular weight polyol. In contrast, if the amount of the low molecular weight polyol is too large, the reaction with the polyisocyanate (A) may be too quickened. Accordingly, the content of the low molecular weight polyol is preferably 5 mass % or less, more preferably 3 mass % or less, of the polyol (B).

A polyol (B) having a weight average molecular weight (Mw) of 400 to 5,000 is preferred because it has a viscosity within a proper range to improve not only the coating properties but also the cohesive force of the two-component curing adhesive.

The polyol (B) preferably has a hydroxy value of 50 mg KOH/g or more and 300 mg KOH/g or less and more preferably 100 mg KOH/g or more and 250 mg KOH/g or less.

The hydroxy value of the polyol (B) can be measured by the hydroxy value measurement method described in JIS-K0070.

(Polyamine (C))

The polyol composition (Y) preferably includes a polyamine (C). The polyamine (C) functions as a curing accelerator.

As the polyamine (C), a known polyamine can be used without particular limitation. The polyamine (C) is desirably a compound having two or more amino groups (NH group or NHR group (R represents an alkyl group)) in the molecule in order to keep the strength of a coated film made of the two-component curing adhesive.

Examples of the polyamine (C) include methylenediamine, ethylenediamine, isophoronediamine, 3,9-dipropaneamine-2,4,8,10-tetraoxaspiro undecane, lysine, phenylenediamine, 2,2,4-trimethylhexamethylenediamine, tolylenediamine, hydrazine, piperazine, hexamethylenediamine, propylenediamine, dicyclohexylmethane-4,4-diamine, 2-hydroxyethylethylenediamine, di-2-hydroxyethylethylenediamine, di-2-hydroxyethylpropylenediamine, 2-hydroxypropylethylenediamine, di-2hydroxypropylethylenediamine, poly(propylene glycol)diamine, poly(propylene glycol)triamine, poly(propylene glycol)tetraamine, 1,2-diaminopropane, and 1,3-diaminopropane;

1,4-Diaminobutane, 1,5-diaminopentane, 1,6-diaminohexane, 1,7-diaminoheptane, 1,8-diaminooctane, 1,9-diaminononane, 1,10-diaminodecane, etc., benzylamine, diethylenetriamine, dipropylenetriamine, triethylenetramine, tripropylenetetramine, tetraethylenepentamine, tetrapropylenepentamine, pentaethylenehexamine, nonaethylenedecamine, trimethylhexamethylenediamine, etc., tetra(aminomethyl)methane, tetrakis(2-aminoethylaminomethyl)methane, 1,3-bis(2'-aminoethylamino)propane, triethylenebis (trimethylene) hexamine, bis(3-aminoethyl)amine, bishexamethylenetriamine, etc., 1,4-cyclohexanediamine, 4,4'-methylenebiscyclohexylamine, 4,4'-isopropylidenebiscyclohexylamine, and norbornadiamine;

Bis(aminomethyl)cyclohexane, diaminodicyclohexylmethane, isophoronediamine, mensendiamine, etc., bis(aminoalkyl)benzene, bis(aminoalkyl) naphthalene, bis(cyanoethyl)diethylenetriamine, ortho-xylenediamine, meta-xylenediamine, para-xylenediamine, phenylenediamine, naphthylenediamine, diaminodiphenylmethane, diaminodiethylphenylmethane, 2,2-bis(4-aminophenyl)propane, 4,4'-diaminodiphenyl ether, 4,4'-diaminobenzophenone, 4,4'-diaminodiphenyl ether, 4,4'-diaminodiphenyl sulfone, 2,2'-dimethyl-4,4'-diaminodiphenylmethane, 2,4'-diaminobiphenyl, 2,3'-dimethyl-4,4'-diaminobiphenyl, 3,3'-dimethoxy-4,4'-diaminobiphenyl, bis(aminomethyl) naphthalene, bis(aminoethyl)naphthalene, etc., N-methylpiperazine, morpholine, 1,4-bis-(8-aminopropyl)-piperazine, piperazine-1,4-diazacycloheptane, 1-(2'-aminoethylpiperazine), 1-12'-(2"-aminoethylamino)ethyl)piperazine, tricyclodecanediamine, and polyureaamines as reaction products of the above-mentioned various polyamines and the above-mentioned various isocyanate components.

As the polyamine (C), it is preferably to use a polyether amine having a polyether structure in the main chain in order to keep the flexibility of a coated film made of the two-component curing adhesive.

These polyamines (C) may be used alone or in combination of two or more thereof.

As the polyamine (C), a commercially available product may be used. Examples of the commercially available product include EC-310 and EC-303 manufactured by BASF SE.

The molar ratio of the functional group (the isocyanate group possessed by the polyisocyanate (A)) in the polyisocyanate composition (X) and the functional groups (the hydroxy group possessed by the polyol (B) and the amino group possessed by the polyamine (C)) in the polyol composition (Y), [isocyanate group/(hydroxy group and amino group)], is desirably 0.5 to 5.0 and is further desirably within a range of 1.0 to 3.0 from the viewpoint of the adhesion performance of the two-component curing adhesive.

As the proportions of the polyol (B) and the polyamine (C) in the polyol composition (Y), the molar ratio of the amino group derived from the polyamine (C) and the hydroxy group derived from the polyol (B), [amino group/hydroxy group], is desirably 0.001 to 2.0 and more preferably within a range of 0.1 to 1.0 from the viewpoint of establishing the adhesion strength, the processed appearance, and the practicability of processability of the two-component curing adhesive. When the molar ratio is 0.001 ox more, the laminated film manufactured using the two-component curing adhesive has good processability. When the molar ratio is 2.0 or less, the two-component curing adhesive has good adhesion strength.

(Solvent)

Although the two-component curing adhesive of the present embodiment can be used as a solvent-free adhesive, the two-component curing adhesive of the present embodiment may contain a solvent as needed.

The term "solvent" in the present embodiment refers to an organic solvent having high solubility that can dissolve the polyisocyanate composition (X) and/or the polyol composition (Y). The term "solvent-free" in the present embodiment refers to that these organic solvents with high solubility are not included.

Examples of the organic solvent (solvent) with high solubility include toluene, xylene, methylene chloride, tetrahydrofuran, methanol, ethanol, isopropyl alcohol, methyl acetate, ethyl acetate, n-butyl acetate, acetone, methyl ethyl ketone (KEK), cyclohexanone, n-hexane, and cyclohexane. Among these examples, toluene, xylene, methylene chloride, tetrahydrofuran, methyl acetate, and ethyl acetate are organic solvents having particularly high solubility.

When the two-component curing adhesive of the present embodiment is demanded to reduce the viscosity, it can be used by being diluted with a solvent to a desired viscosity. In such a case, only one of the polyisocyanate composition (X) and the polyol composition (Y) may be diluted with a solvent, or both may be diluted.

Examples of the organic solvent that may be contained in the two-component curing adhesive of the present embodiment include methanol, ethanol, isopropyl alcohol, methyl acetate, ethyl acetate, n-butyl acetate, acetone, methyl ethyl ketone (MEK), cyclohexanone, toluene, xylene, n-hexane, and cyclohexane. Among these examples, it is preferable to use ethyl acetate and/or methyl ethyl ketone (MEK), in particular, ethyl acetate from the viewpoint of solubility of the polyisocyanate composition (X) and the polyol composition (Y).

The content of the organic solvent in the two-component curing adhesive of the present embodiment can be appropriately determined based on the required viscosity and can be, for example, 20 to 50 mass %.

(Catalyst)

The two-component curing adhesive of the present embodiment may contain a catalyst. The catalyst may be included in only one of the polyisocyanate composition (X) and the polyol composition (Y) or may be included in both. The catalyst is preferably included only in the polyol composition (Y) from the viewpoint of generally high reactivity with a polyisocyanate composition and of effectively applying the catalyst after the contact between the polyisocyanate composition (X) and the polyol composition (Y). The catalyst may be added to the polyisocyanate composition (X) and/or the polyol composition (Y) at the time of coating of the two-component curing adhesive.

When the two-component curing adhesive includes a catalyst, the curing of the two-component curing adhesive is promoted, and a harmful low molecular weight chemical material represented by an aromatic amine is prevented from flowing out from the laminated film manufactured using the two-component curing adhesive. That is, the catalyst also functions as a curing accelerator as in the polyamine (C).

The catalyst is not particularly limited as long as the urethanization reaction between the polyisocyanate composition (X) and the polyol composition (Y) is promoted. As the catalyst, for example, a metal-based catalyst, an amine-based catalyst, diazabicycloundecene (DBU), an alicyclic amide compound, or a titanium chelate complex can be used.

Examples of the metal-based catalyst include a metal complex-based catalyst, an inorganic metal-based catalyst, and an organic metal-based catalyst.

Examples of the metal complex-based catalyst include acetylacetonate salts of a metal selected from the group consisting of Fe (iron), Mn (manganese), Cu (copper), Zr (zirconium), Th (thorium), Ti (titanium), Al (aluminum), and Co (cobalt). Specifically, for example, iron acetylacetonate, manganese acetylacetonate, copper acetylacetonate, and zirconium acetylacetonate are mentioned. Among these metal complex-based catalysts, from the viewpoint of toxicity and catalyst activity, iron acetylacetonate (Fe(acac)$_3$) and/or manganese acetylacetonate (Mn(acac)$_2$) are preferable.

Examples of the organic metal-based catalyst include stannous diacetate, stannous dioctoate, stannous dioleate, stannous dilaurate, dibutyl tin oxide, dibutyl tin diacetate, dibutyl tin dilaurate, dibutyl tin dichloride, dioctyl tin dilaurate, nickel octylate, nickel naphthenate, cobalt octylate, cobalt naphthenate, bismuth octylate, bismuth naphthenate, bismuth neodecanoate, and zinc neodecanoate. Among these examples, preferable organic metal-based catalysts are stannous dioctate, dibutyl tin dilaurate, bismuth neodecanoate, zinc neodecanoate, and mixture thereof.

Examples of the amine-based catalyst include triethylenediamine, 2-methyltriethylenediamine, quinuclidine, and 2-methylquinuclidine. Among these examples, since triethylenediamine and/or 2-methyltriethylenediamine has excellent catalyst activity and is industrially available, it is preferable to use them as the amine-based catalyst.

As other tertiary amine catalysts, examples thereof include N,N,N',N'-tetramethylethylenediamine, N,N,N',N'-tetramethylpropylenediamirne, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylhexamethylenediamine, bis(2-dimethylaminoethyl) ether, dimethylethanolamine, dimethylisoproparnolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl) isopropanolamine, 3-quinuclidinol, N,N,N',N''-tetramethylguanidine, 1,3,5-tris(N,N dimethylaminopropyl) hexahydro-S-triazine, 1,8-diazabicyclo[5.4.0]undecene-7, N-methyl-N''-(2-dimethylaminoethyl)piperazine, N,N'-dimethylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethylhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, and 1-(2-hydroxypropyl)-2-methylimidazole.

Examples of the alicyclic amide compound that is used as the catalyst include 5-valerolactam, s-caprolactam, ω-enanthollactam, η-capryllactam, and β-propiolactam. Among these alicyclic amide compounds, ε-caprolactam can effectively promote curing of the two-component curing adhesive.

The content of the catalyst in the two-component curing adhesive of the present embodiment is not particularly limited and may be a known amount. The content of the catalyst can be, for example, 0.001 to 5.0 mass % based on the total solid content of the two-component curing adhesive.

(Adhesion Promoter)

The two-component curing adhesive of the present embodiment may contain an adhesion promoter. The adhesion promoter may be included in only one of the polyisocyanate composition (X) and the polyol composition (Y) or may be included in both. The adhesion promoter is highly reactive with the polyisocyanate composition (X) and is therefore preferably applied after the contact between the polyisocyanate composition (X) and the polyol composition (Y). Accordingly, the adhesion promoter is preferably included in only the polyol composition (Y). The adhesion promoter may be added to the polyisocyanate composition (X) and/or the polyol composition (Y) at the time of coating of the two-component curing adhesive.

Examples of the adhesion promoter include a silane coupling agent, a titanate-based coupling agent, an aluminum-based coupling agent, and an epoxy resin.

Examples of the silane coupling agent include aminosilanes, such as γ-aminopropyltriethoxysilane, 3-glycidyloxypropyltrimethoxysilane, γ-aminopropyltrimethoxysilane, N-β(aminoethyl)-γ-aminopropyltrimethoxysilane, N-β(aminoethyl)-γ-aminopropyltrimethyldimethoxysilane, N-phenyl-γ aminopropyltrimethoxysiiane; epoxysilanes, such as β-(3,4-epoxycyclohexyl)ethyltrimethoxysilane, γ-glycidoxypropyltrimethoxysilane, and γ-glycidoxypropyltriethoxysilane; vinylsilanes, such as vinyltris(β-methoxyethoxy) silane, vinyltriethoxysilane, vinyltrimethoxysilane, and γ-methacryloxypropyltrimethoxysilane; and hexamethyldisilazane and γ-mercaptopropyltrimethoxysilane.

Examples of the titanate-based coupling agent include tetraisopropoxytitanium, tetra-n-butoxytitanium, butyl titanate dimer, tetrastearyl titanate, titanium acetylacetonate, titanium lactate, tetraoctylene glycol titanate, titanium lactate, and tetrastearoxytitanium.

Examples of the aluminum-based coupling agent include acetoalkoxyaluminum diisopropylate.

Examples of the epoxy resin include generally commercially available various epoxy resins, such as epi-bis type, novolak type, β-methylepichloro type, cyclic oxirane type, glycidyl ether type, glycidyl ester type, polyglycol ether type, glycol ether type, epoxidized fatty acid ester type, polyvalent carboxylic acid ester type, aminoglycidyl type, and resorcin type epoxy resins.

The content of the adhesion promoter in the two-component curing adhesive of the present embodiment is not particularly limited and may be a known amount. The content of the adhesion promoter can be, for example, 0 to 50 mass % based on the total solid content of the two-component curing adhesive.

(Pigment)

The two-component curing adhesive of the present embodiment may include a pigment as needed. The pigment may be included in only one of the polyisocyanate composition (X) and the polyol composition (Y) or may be included in both. The pigment may be added to the polyisocyanate composition (X) and/or the polyol composition (Y) at the time of coating of the two-component curing adhesive.

The pigment is not particularly limited, and various pigments are mentioned. Examples of the pigment include organic pigments, such as an extender pigment, a white pigment, a black pigment, a gray pigment, a red pigment, a brown pigment, a green pigment, a blue pigment, a metal powder pigment, a luminescent pigment, and a pearl pigment; organic pigments; and plastic pigments described in Paint Raw Material Handbook, 1970 edition (edited by Japan Paint Manufacturers Association).

Examples of the organic pigment include various insoluble azo pigments, such as Benzidine yellow, Hansa yellow, and lake red 4R; soluble azo pigments, such as lake red C, carmine 6B, and Bordeaux 10; various (copper) phthalocyanine based pigments, such as phthalocyanine blue and phthalocyanine green; various chlorine dyeing lakes, such as rhodamine lake and methyl violet lake; various mordant dye pigments, such as quinoline lake and fast sky blue; various vat dye pigments, such as an anthraquinone pigment, a thioindigo pigment, and a perinone pigment; various quinacridone pigments, such as Cinquasia Red B; various dioxazine pigments, such as dioxazine violet; various condensed azo pigments, such as Cromophtal; and aniline black.

Examples of the inorganic pigment include various chromates, such as chrome yellow, zinc chromate, and molybdate orange; various ferrocyanide compounds, such as Prussian blue; various metal oxides, such as titanium oxide, zinc oxide, Mapico yellow, iron oxide, red iron oxide, chrome oxide green, and zirconium oxide; various sulfides and selenides, such as cadmium yellow, cadmium red, and mercury sulfide; various sulfates, such as barium sulfate and lead sulfate; various silicates, such as calcium silicate and ultramarine blue; various carbonates, such as calcium carbonate and magnesium carbonate; various phosphates, such as cobalt violet and manganese violet; various metal powder pigments, such as aluminum powder, gold powder, silver powder, copper powder, bronze powder, and brass powder; flake pigments of these metals and a mica flake pigment; metallic pigments and pearl pigments, such as a mica flake pigment coated with a metal oxide and a micaceous iron oxide pigment; and graphite and carbon black.

Examples of the extender pigment include sedimentary barium sulfate, gohun, sedimentary calcium carbonate, calcium bicarbonate, white limestone, alumina white, silica, fine hydrous silica powder (white carbon), ultrafine anhydrous silica powder (aerosil), silica sand, talc, sedimentary magnesium carbonate, bentonite, clay, kaolin, and yellow ocher.

Examples of the plastic pigment include "GRANDOLL PP-1000" and "PP-2000S" manufactured by DIC Corporation.

As the pigment, it is preferable to use an inorganic oxide, such as titanium oxide and zinc oxide, as a white pigment and carbon black as a black pigment, because they are excellent in durability, weather resistance, and designability.

The content of the pigment in the two-component curing adhesive of the present embodiment is preferably 1 to 400 parts by mass, more preferably 10 to 300 parts by mass, based on 100 parts by mass of the total solid content of the polyisocyanate composition (X) of the polyol composition (Y). When the content of the pigment is 1 to 400 parts by mass, the two-component curing adhesive has excellent adhesive properties and blocking resistance.

(Additive)

The two-component curing adhesive of the present invention may contain an additive, in addition to the above-described components, as needed. The additive may be included in only one of the polyisocyanate composition (X) and the polyol composition (Y) or may be included in both. The additive may be added to the polyisocyanate composition (X) and/or the polyol composition (Y) at the time of coating of the two-component curing adhesive.

Examples of the additive include a leveling agent; inorganic fine particles, such as colloidal silica and alumina sol; polymethyl methacrylate-based organic fine particles; an antifoaming agent; an anti-dripping agent; a wetting and dispersing agent; a viscosity modifier; an UV absorber; a metal inactivating agent; a peroxide decomposing agent; a flame retardant; a reinforcing agent; a plasticizer; a lubricant; an anticorrosive; a fluorescent brightening agent; an inorganic heat ray absorber; a fire-extinguishing agent; an antistatic agent; and a dehydrating agent.

The two-component curing adhesive of the present embodiment is a two-component curing adhesive using a curing reaction between a polyisocyanate composition (X) and a polyol composition (Y), wherein the polyisocyanate composition (X) includes a polyisocyanate (A), the polyol composition (Y) includes a polyol (B), and the polyisocyanate composition (X) and the polyol composition (Y) each have an elongational viscosity of 0.1 to 10 Pa·s.

Accordingly, when a laminated film is manufactured by a manufacturing method including a two-component separate application process, the two-component curing adhesive of the present embodiment is unlikely to cause misting in a step of bringing the polyisocyanate composition (X) applied on a first film and the polyol composition (Y) applied on a second film into contact with each other, and the initial cohesive force is also excellent.

Consequently, the two-component curing adhesive of the present embodiment can be suitably used when manufacturing a laminated film by, for example, a manufacturing method including a two-component mixing application process or a manufacturing method including a two-component separate application process.

In particular, when a laminated film is manufactured by a method including a two-component separate application process, misting is likely to occur. According to the two-component curing adhesive of the present embodiment, occurrence of misting can be suppressed in that the elongational viscosities of the polyisocyanate composition (X) and the polyol composition (Y) are each 0.1 to 10 Pa·s. In addition, in a method including a two-component separate application process, although the initial cohesive force may be insufficient, this problem of initial cohesive force can be solved in that the elongational viscosities of the polyisocyanate composition (X) and the polyol composition (Y) are each 0.1 to 10 Pa·s.

Consequently, the two-component curing adhesive of the present embodiment can be particularly suitably used when a laminated film is manufactured by a method including a two-component separate application process.

In the two-component curing adhesive of the present embodiment, the polyisocyanate composition (X) and the polyol composition (Y) each have an elongational viscosity of 0.1 to 10 Pa·s. In the two-component curing adhesive of the present embodiment, the reactivity between the polyol composition (Y) and the polyisocyanate composition (X) is good. Accordingly, it is possible to lower the aging temperature or shorten the aging time.

[Laminated Film]

A laminated film of the present embodiment will then be described in detail using a drawing.

FIG. 1 is a cross-sectional view showing an example of a laminated film according to the present embodiment. As shown in FIG. 1, the laminated film 11a of the present embodiment includes an adhesive layer 10 between a first film W1 and a second film W2. In the laminated film 11a of the present embodiment, the adhesive layer 10 is made of a cured product of the two-component curing adhesive of the above-described embodiment.

(Film)

In the laminated film 11a of the present embodiment, the films used as the first film W1 and the second film W2 are preferably plastic films that are used in known laminated films.

As the first film W1, for example, a base film, such as a polyethylene terephthalate (hereinafter, may be abbreviated to "PET") film, a nylon (OPA) film, a biaxially oriented polypropylene (OPP) film, and various vapor deposited films, or aluminum foil can be used.

As the second film W2, for example, a sealant film, such as a cast polypropylene (CPP) film and a linear low-density polyethylene (LLDPE) film, can be used.

As the first film W1 and the second film W2, paper, such as natural paper, synthetic paper, and coating paper, may be used.

A printing layer may be provided on the outer surface or the inner surface of the first film W1 and/or the second film W2 as needed.

The laminated film 11a of the present embodiment can be industrially used as, for example, a flexible packaging film, a flexible packaging (packaging whose shape is formed by putting a content therein) material, or a packaging material to be filled with detergent, medicine, food, a beverage, etc. Examples of the detergent and medicine include liquid detergent for laundry, liquid detergent for kitchen, liquid detergent for bath, liquid soap for bath, liquid shampoo, and liquid conditioner. The food and the beverage are not particularly limited.

The laminated film 11a of the present embodiment can be used as a package by being formed into a bag shape.

The laminated film 11a of the present embodiment includes an adhesive layer 10 between a first film W1 and a second film W2, and the adhesive layer 10 is made of a cured product of the two-component curing adhesive of the above-described embodiment. Consequently, the laminated film 11a of the present embodiment can be manufactured using the two-component curing adhesive of the above-described embodiment having excellent initial cohesive force and being unlikely to cause misting even if subjected to a step of application onto a film. Accordingly, the laminated film of the present embodiment can be efficiently manufactured using a manufacturing method, such as a manufacturing method including a two-component mixing application process or a manufacturing method including a two-component separate application process. Furthermore, since the two-component curing adhesive of the above-described embodiment is cured for a short time and/or at a low temperature, the laminated film 11a of the present embodiment can be manufactured with a low energy amount.

[Laminated Film-Manufacturing Apparatus]

An apparatus for manufacturing the laminated film 11a of the present embodiment will then be described in detail with reference to the drawings.

Figure 2:
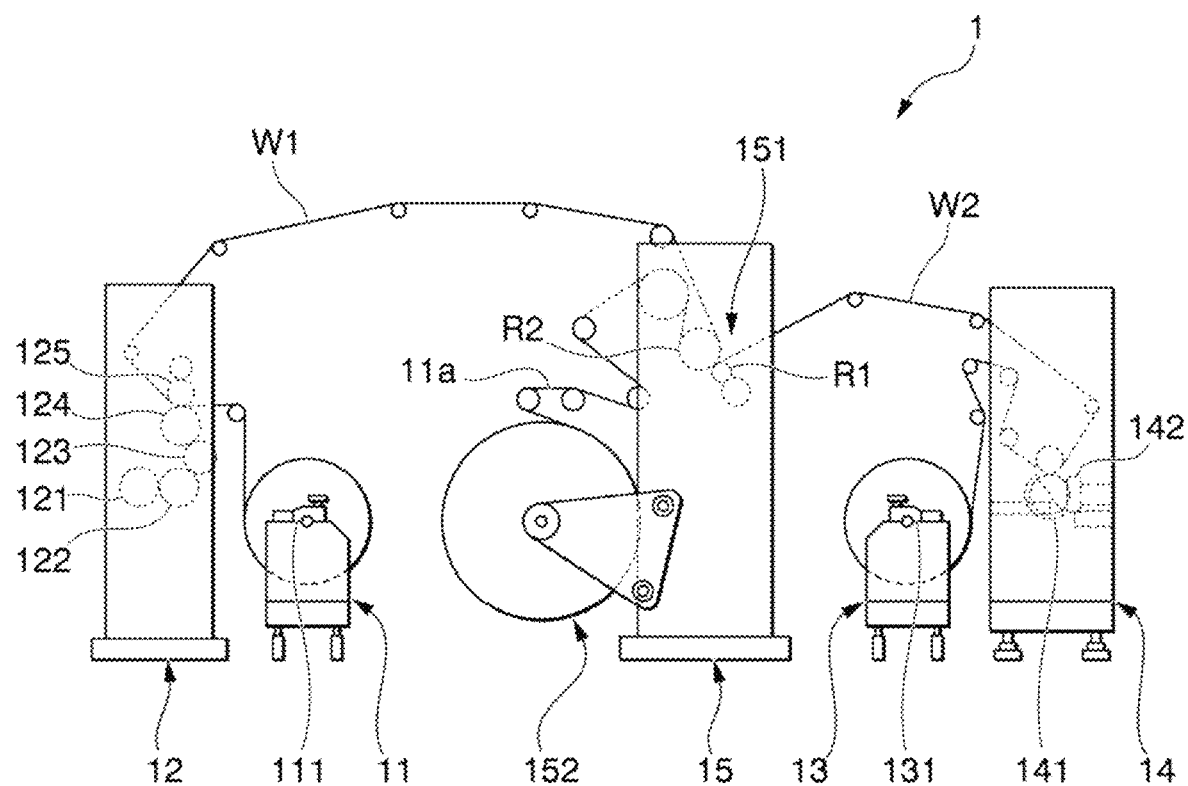
FIG. 2 is a front view of a laminated film-manufacturing apparatus according to the present embodiment.
Figure 3:
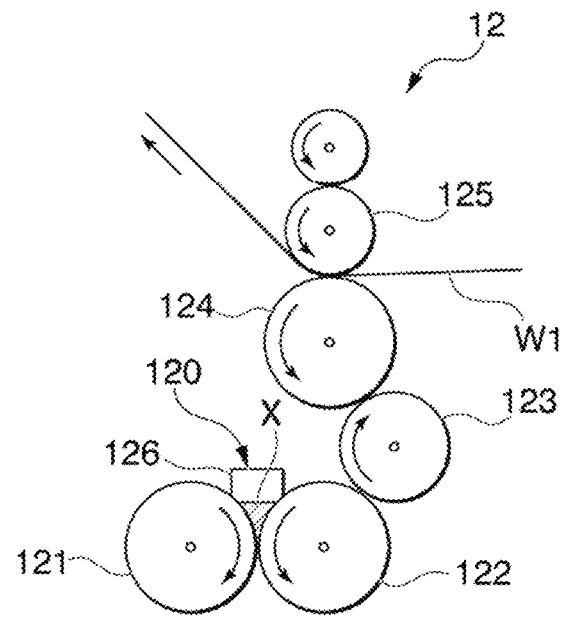
FIG. 3 is a front view showing a main section of the polyisocyanate coating unit in the laminated film-manufacturing apparatus shown in FIG. 2.
Figure 4:
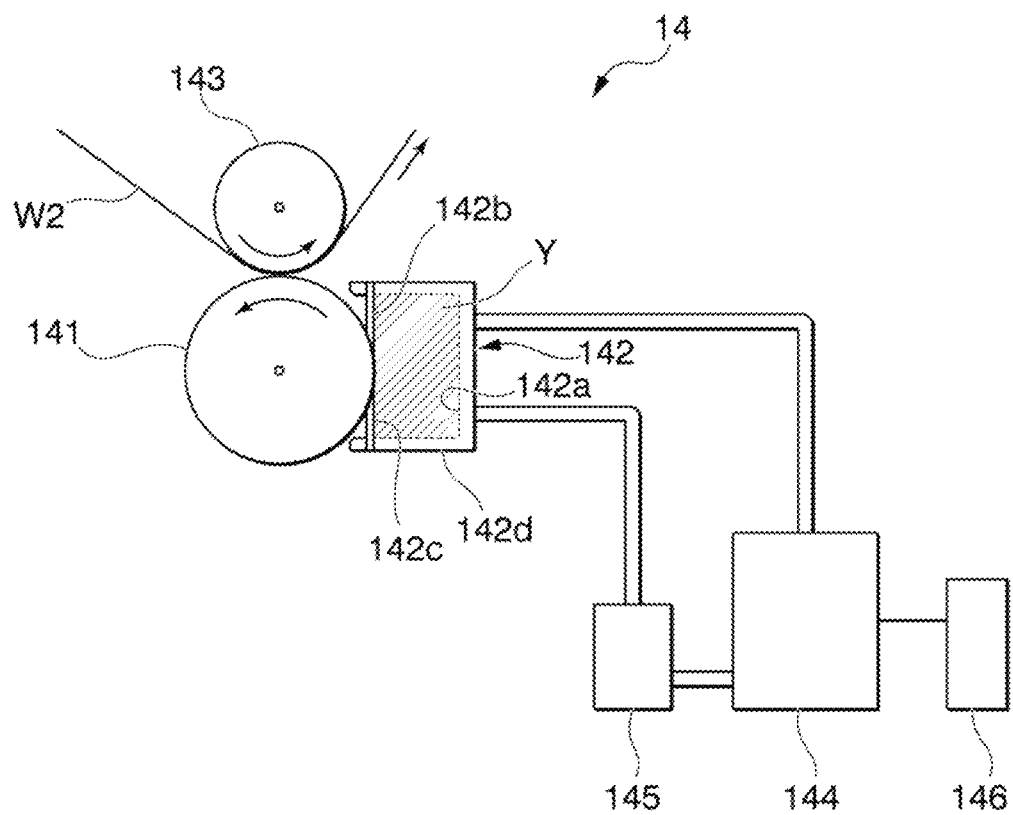
FIG. 4 is a front view showing a main section of the polyol coating unit in the laminated film-manufacturing apparatus shown in FIG. 2.

FIG. 2 is a front view of a laminated film-manufacturing apparatus according to the present embodiment. FIG. 3 is a front view showing a main section of the polyisocyanate coating unit in the laminated film-manufacturing apparatus shown in FIG. 2. FIG. 4 is a front view showing a main section of the polyol coating unit in the laminated film-manufacturing apparatus shown in FIG. 2.

The laminated film-manufacturing apparatus 1 shown in FIG. 2 is an apparatus for manufacturing a laminated film 11a of the above-described embodiment using the two-component curing adhesive of the above-described embodiment by bonding a first film W1 unwound from a roller and a second film W2 unwound from a roller, forming an adhesive layer 10 between the first film W1 and the second film W2, and winding it into a roll shape.

The laminated film-manufacturing apparatus 1 of the present embodiment includes, as shown in FIG. 2, a first unwinding unit 11, a polyisocyanate coating unit 12 (first coating unit), a second unwinding unit 13, a polyol coating unit 14 (second coating unit), and a bonding device 15.

The first unwinding unit 11 sends out a first film W1 to the polyisocyanate coating unit 12. The first film W1 is rotatably mounted on the film mounting unit 111 of the first unwinding unit 11.

The polyisocyanate coating unit 12 applies the polyisocyanate composition (X) of the two-component curing adhesive of the present embodiment to the first film W1 sent out from the first unwinding unit 11.

The polyisocyanate coating unit 12 is a roll coater of a four-roller squeeze system, as shown in FIG. 3. The polyisocyanate coating unit 12 includes an application roller 121, a doctor roller 122, a metering roller 123, a coating roller 124, and a backing roller 125. A liquid reservoir unit 120 is provided at the portion where the application roller 121 and the doctor roller 122 face to each other.

The application roller 121 is a roller having an outer peripheral surface made of an elastic material such as rubber. The doctor roller 122 is a roller having an outer peripheral surface made of a metal (non-elastic material). As shown in FIG. 3, the application roller 121 and the doctor roller 122 are rotatably supported by the polyisocyanate coating unit 12 such that the rotating shafts are parallel to each other. The outer peripheral surface of the application roller 121 and the outer peripheral surface of the doctor roller 122 face to each other with a small space therebetween.

In the upper part of the facing portion of the application roller 121 and the doctor roller 122, a pair of weir plates 126 is installed with a predetermined space in the direction of the rotating shafts of the application roller 121 and the doctor roller 122. The pair of weir plates 126, the outer peripheral surface of the application roller 121, and the outer peripheral surface of the doctor roller 122 form a liquid reservoir unit 120.

The liquid reservoir unit 120 temporarily stores the polyisocyanate composition (X). The polyisocyanate composition (X) is supplied to the liquid reservoir unit 120 from a polyisocyanate supply portion (not shown). Consequently, the amount of the polyisocyanate composition (X) stored in the liquid reservoir unit 120 is maintained constant.

The doctor roller 122 is preferably provided with a temperature controller (not shown). The temperature controller keeps the temperature of the polyisocyanate composition (X) stored in the liquid reservoir unit 120 constant to stabilize the viscosity of the polyisocyanate composition (X). Consequently, the temperature of the outer peripheral surface of the doctor roller 122 is kept certain.

As shown in FIG. 3, the application roller 121 and the doctor roller 122 rotate downward at the Liquid reservoir unit 120. Consequently, the polyisocyanate composition (X) passed through the small space is applied to the outer peripheral surface of the doctor roller 122.

As shown in FIG. 3, the polyisocyanate coating unit 12 rotatably supports the metering roller 123, the coating roller 124, and the backing roller 125.

The polyisocyanate composition (X) applied to the outer peripheral surface of the doctor roller 122 is transferred to the metering roller 123. The rotating shaft of the metering roller 123 is disposed parallel to the rotating shaft of the doctor roller 122. The outer peripheral surface of the metering roller 123 is made of an elastic material such as rubber. The outer peripheral surface of the metering roller 123 is in pressure contact with the outer peripheral surface of the doctor roller 122.

The polyisocyanate composition (X) applied to the outer peripheral surface of the metering roller 123 is transferred to the coating roller 124. The rotating shaft of the coating roller 124 is disposed parallel to the rotating shaft of the metering roller 123. The outer peripheral surface of the coating roller 124 is formed of a metal material. The outer peripheral surface of the coating roller 124 is in pressure contact with the outer peripheral surface of the metering roller 123.

The backing roller 125 is disposed such that the rotating shaft is parallel to the rotating shaft of the coating roller 124. The first film W1 is sandwiched between the backing roller 125 and the coating roller 124 and is transported. The backing roller 125 helps the transfer of the polyisocyanate composition (X) applied to the outer peripheral surface of the coating roller 124 to the first film W1. The outer peripheral surface of the backing roller 125 is formed of an elastic material such as rubber.

The temperature of the outer peripheral surface of the coating roller 124 is preferably kept constant by a temperature controller (not shown) as in the doctor roller 122. Consequently, the viscosity of the polyisocyanate composition (X) applied to the first film W1 is stabilized.

In general, misting occurs when the polyisocyanate composition (X) moves between rollers by transfer. Usually, as the position where misting occurs, for example, a vicinity of the pressure contacting portion of the doctor roller 122 and the metering roller 123, a vicinity of the pressure contacting portion of the metering roller 123 and the coating roller 124, and a vicinity of the pressure contact portion of the coating roller 124 and the backing roller 125 are mentioned. When misting occurs, it is necessary to reduce the rotation speed of each roller and the transport speed of the first film W1 for suppressing occurrence of misting. However, a reduction in the transport speed of the first film W1 decreases the production efficiency of the laminated film 11a.

In the present embodiment, occurrence of misting can be suppressed by using a composition having a specific elongational viscosity as the polyisocyanate composition (X). As a result, a laminated film 11a having excellent characteristics can be efficiently manufactured. When the application of the polyisocyanate composition (X) is performed using a roll coater as in the present embodiment, the position where misting occurs is increased. Accordingly, the effect by strictly controlling the elongational viscosity of the polyisocyanate composition (X) becomes more strict.

The second unwinding unit 13 sends out the second film W2 to the polyol coating unit 14. The second film W2 is rotatably mounted on the film mounting unit 131 of the second unwinding unit 13.

The polyol coating unit 14 applies the polyol composition (Y) of the two-component curing adhesive of the present embodiment to the second film W2 sent out from the second unwinding unit 13.

The polyol coating unit 14 is a gravure coater for applying the polyol composition (Y) by gravure printing as shown in FIG. 4. The polyol coating unit 14 includes a gravure roller 141, a chamber 142, an impression drum 143, a coating liquid tank 144, a pump 145, and a temperature controller 146.

The gravure roller 141 is a metal roller rotatably supported by the polyol coating unit 14. The surface of the gravure roller 141 is provided with a plurality of concavities (gravure pattern) by, for example, laser engraving. The amount of the coating liquid to be applied to the surface of the gravure roller 141 can be adjusted by changing, for example, the volume, the opening ratio, and the depth of the concavities. The gravure pattern formed on the surface of the gravure roller 141 is not particularly limited and can be, for example, a honeycomb pattern.

As shown in FIG. 4, the chamber 142 is a container for storing the polyol composition (Y). The chamber 142 is disposed on one side of the gravure roller 141 in the radial direction.

The chamber 142 includes a reservoir 142a for storing the polyol composition (Y). The reservoir 142a is opened on the gravure roller 141 side. The outer peripheral surface of the gravure roller 141 is partially immersed in the polyol composition (Y) stored in the reservoir 142a.

The reservoir 142a is sealed by a doctor blade 142b, a seal plate 142c, and a pair of side plates 142d.

The chamber 142 includes a plate-like doctor blade 142b. The doctor blade 142b is arranged so as to protrude from the top end of the opening of the reservoir 142a toward the gravure roller 141. The material of the doctor blade 142b is not particularly limited and may be a metal or a resin and can be, for example, stainless steel.

The distal portion of the doctor blade 142b is in pressure contact with the outer peripheral surface of the gravure roller 141. The distal portion of the doctor blade 142b3 seals the reservoir 142a at the downstream side in the roller rotation direction. The doctor blade 142b scrapes the excess polyol composition (Y) adhering to the outer peripheral surface of the gravure roller 141 by the rotation operation of the gravure roller 141 and measures the amount.

The chamber 142 includes a plate-like seal plate 142c. The seal plate 142c is made of a resin. The seal plate 142c is arranged so as to protrude from the bottom end of the opening of the reservoir 142a toward the gravure roller 141.

The distal portion of the seal plate 142c is in pressure contact with the outer peripheral surface of the gravure roller 141. The distal portion of the seal plate 142c seals the reservoir 142a at the upstream side in the roller rotation direction.

The chamber 142 includes side plates 142d made of a resin. The side plates 142d are installed on both side surfaces of the chamber 142, that is, on both ends of the gravure roller 141 in the rotating shaft direction.

As shown in FIG. 4, the side surface of each of the side plates 142d on the gravure roller 141 side has an arc shape along the shape of the gravure roller 141 and is in pressure contact with the gravure roller 141.

The second film W2 is sandwiched between the impression drum 143 and the gravure roller 141 as shown in FIG. 4 and is transported. The second film W2 is brought into pressure contact with the gravure roller 141 by the impression drum 143, and the polyol composition (Y) applied to the outer peripheral surface of the gravure roller 141 is transferred to the second film W2.

In general, misting occurs when the polyol composition (Y) moves between rollers by transfer. In the present embodiment, misting of the polyol composition (Y) occurs in a vicinity of the pressure contacting portion of the gravure roller 141 and the impression drum 143. When misting occurs, it is necessary to reduce the rotation speed of each roller and the transport speed of the second film W2 for suppressing occurrence of misting. However, a reduction in the transport speed of the second film W2 decreases the production efficiency of the laminated film 11a.

In the present embodiment, occurrence of misting can be suppressed by using a composition having a specific elongational viscosity as the polyol composition (Y). As a result, a laminated film 11a having excellent characteristics can be efficiently manufactured.

The coating liquid tank 144 is a container for storing the polyol composition (Y). As shown in FIG. 4, the coating liquid tank 144 is connected, via piping, to the pump 145 that allows the polyol composition (Y) to flow in the chamber 142. The coating liquid tank 144 is connected to the chamber 142 via piping. Consequently, the polyol composition (Y) overflowed from the reservoir 142a of the chamber 142 is recovered into the coating liquid tank 144.

The pump 145 is connected to the coating liquid tank 144 and the chamber 142 via piping. The pump 145 supplies the polyol composition (Y) stored in the coating liquid tank 144 to the reservoir 142a of the chamber 142. As the pump 145, for example, a sine pump can be used.

The temperature controller 146 controls the temperature of the polyol composition (Y) stored in the coating liquid tank 144. Consequently, the temperature of the polyol composition (Y) is kept constant, and the viscosity of the polyol composition (Y) is stabilized. The temperature controller 146 is, for example, a water temperature adjuster that heats water as a heat transfer medium with a heater and allows the water to circulate in the periphery of the polyol composition (Y) stored in the coating liquid tank 144.

As shown in FIG. 2, the bonding device 15 includes a bonding unit 151 and a winding unit 152.

The bonding unit 151 bonds the polyisocyanate composition (X)-coated surface of the first film W1 sent out from the polyisocyanate coating unit 12 and the polyol composition (Y)-coated surface of the second film W2 sent out from the polyol coating unit 14. The winding unit 152 winds the laminated film 11a bonded by the bonding unit 151.

The bonding unit 151 includes, as shown in FIG. 2, a pair of lamination rollers R1 and R2. The lamination rollers R1 and R2 sandwich and bond the first film W1 and the second film W2 and transport them. The temperature of the outer peripheral surfaces of the two lamination rollers R1 and R2 is kept constant by a temperature controller (not shown). Consequently, curing of the two-component curing adhesive is stabilized.

As shown in FIG. 2, the bonding unit 151 allows the first film W1 and the second film W2 to pass through between the two lamination rollers R1 and R2 disposed opposite to each other and brings the coated surface of the first film W1 sent out from the polyisocyanate coating unit 12 and the coated surface of the second film W2 sent out from the polyol coating unit 14 into contact with each other to bond them. In the bonding unit 151, the polyisocyanate composition (X) applied to the first film W1 and the polyol composition (Y) applied to the second film W2 are mixed with each other to start curing of the two-component curing adhesive, and the first film W1 and the second film W2 are bonded and fixed to each other.

The winding unit 152 winds the laminated film 11a formed by bonding the first film W1 and the second film W2 in the bonding unit 151.

[Method for Manufacturing Laminated Film]

As a method for manufacturing a laminated film of the present embodiment, a case of manufacturing the laminated film 11a shown in FIG. 1 with the laminated film-manufacturing apparatus 1 shown in FIGS. 2 to 4 and using the two-component curing adhesive of the above-described embodiment will then be described as an example.

The method for manufacturing a laminated film 11a of the present embodiment includes a two-component separate application process and an adhesive layer forming process. In the present embodiment, the two-component separate application process and the adhesive layer forming process are continuously performed.

(Two-Component Separate Application Process)

The two-component separate application process is composed of a first application step of applying a polyisocyanate composition (X) that includes a polyisocyanate (A) and has an elongational viscosity of 0.1 to 10 Pa·s to a first film W1 and a second application step of applying a polyol composition (Y) that includes a polyol (B) and has an elongational viscosity of 0.1 to 10 Pa·s to a second film W2. In the present embodiment, the first:

application step and the second application step are simultaneously performed.

"First Application Step"

A method of performing the first application step using the laminated film-manufacturing apparatus 1 shown in FIGS. 2 to 4 will be described.

First, the first film W1 is sent out from the first unwinding unit 11 to the polyisocyanate coating unit 12. In the polyisocyanate coating unit 12, each roller is rotated in the direction indicated by the arrow mark in FIG. 3. Consequently, the polyisocyanate composition (X) stored in the liquid reservoir unit 120 is applied to the surface of the doctor roller 122.

In the present embodiment, the temperature of the polyisocyanate composition (X) stored in the liquid reservoir unit 120 is preferably set to 25° C. to 80° C., more preferably 25° C. to 40° C., by the temperature controller (not shown).

In the present embodiment, the shear viscosity of the polyisocyanate composition (X) at 40° C. is preferably 3,000 mPa·s or less and more preferably 2,000 mPa·s or less.

The polyisocyanate composition (X) applied to the doctor roller 122 is transferred to the metering roller 123 and the coating roller 124 sequentially. The rotation speeds of the rollers of the polyisocyanate coating unit 12 are set such that the rotation speeds sequentially increase. Consequently, the thickness of the coated film of the polyisocyanate composition (X) is gradually decreased, and the coating roller 124 adjusts the thickness of the coated film (application amount) to a certain level.

The polyisocyanate composition (X) transferred to the coating roller 124 is transferred to the first film W1 that is transported between the coating roller 124 and the backing roller 125. Consequently, the polyisocyanate composition (X) is applied to the first film W1.

In the present embodiment, the application amount of the polyisocyanate composition (X) to be applied to the first film W1 is preferably 0.5 to 3.0 g/m and more preferably 0.5 to 2.0 g/m$^2$.

In the polyisocyanate coating unit 12, the first film W1 coated with the polyisocyanate composition (X) is sent out to the bonding device 15.

"Second Application Step"

A method of performing the second application step using the laminated film-manufacturing apparatus 1 shown in FIGS. 2 to 4 will then be described.

First, the second film W2 is sent out from the second unwinding unit 13 to the polyol coating unit 14. In the polyol coating unit 14, the gravure roller 141 and the impression drum 143 are rotated in the direction indicated by the arrow mark in FIG. 4. The polyol composition (Y) in the chamber 142 is applied to the second film W2 through the surface of the gravure roller 141 by the rotation operation of the gravure roller 141.

In the present embodiment, the application amount of the polyol composition (Y) to be applied to the second film W2 is preferably 0.5 to 3.0 g/m$^2$ and more preferably 0.5 to 2.0 g/m$^2$.

In the present embodiment, the temperature of the polyol composition (Y) stored in the coating liquid tank 144 is preferably set to 25° C. to 80° C., more preferably 25° C. to 40° C., by the temperature controller 146.

In the present embodiment, the viscosity of the polyol composition (Y) is adjusted to a viscosity suitable for a gravure coater.

The rotation direction of the gravure roller 141 may be the positive rotation that is the same direction as the transport direction of the second film W2 or may be a reverse rotation that is the opposite direction to the transport direction of the second film W2. In the present embodiment, as shown in FIG. 4, the gravure roller 141 transfers the polyol composition (Y) to the second film W2 while rotating in the opposite direction to the transport direction of the second film W2. Consequently, the appearance of the polyol composition (Y) applied to the second film W2 can be made good without causing vertical streaks, the grain of rollers, etc.

In the polyol coating unit 14, the second film W2 coated with the polyol composition (Y) is sent out to the bonding device 15.

(Adhesive Layer Forming Process)

In the adhesive layer forming process, the polyisocyanate composition (X) applied on the first film W1 and the polyol composition (Y) applied on the second film are brought into contact with each other by laminating the first film W1 and the second film W2 to cause a curing reaction.

In the bonding unit 151 of the bonding device 15, as shown in FIG. 2, the first film W1 and the second film W2 in a contact state are sandwiched between the two lamination rollers R1 and R2 disposed opposite to each other and pass through between the two lamination rollers R1 and R2. Consequently, the first film W1 and the second film W2 are bonded to each other by the pressure from the two lamination rollers R1 and R2.

In the present embodiment, the temperature of the outer peripheral surfaces of the two lamination rollers R1 and R2 is preferably set to 40° C. to 80° C. and more preferably 40° C. to 60° C.

The pressure from the two lamination rollers R1 and R2 to the first film W1 and the second film W2 can be, for example, 3 to 300 kg/cm$^2$.

In the present embodiment, the coated surface of the first film W1 sent out from the polyisocyanate coating unit 12 and the coated surface of the second film W2 sent out from the polyol coating unit 14 are brought into contact with each other by being sandwiched between the two lamination rollers R1 and R2. As a result, the polyisocyanate composition (X) applied to the first film W1 and the polyol composition (Y) applied to the second film W2 are mixed to start the curing of the two-component curing adhesive.

A laminated film 11a including an adhesive layer 10 between the first film W1 and the second film W2 is obtained by curing the two-component curing adhesive.

The laminated film 11a produced by bonding the first film W1 and the second film W2 in the bonding unit 151 is transported to the winding unit 152. The laminated film 11a transported to the winding unit 152 is wound by the winding unit 152.

In the method for manufacturing the laminated film 11a of the present embodiment, the film transport speed (winding speed of the laminated film 11a in the winding unit 152) when the laminated film 11a is manufactured can be, for example, 30 to 300 m/min and is preferably 100 to 250 m/min. In the method for manufacturing the laminated film 11a of the present embodiment, since the laminated film 11a is manufactured using the two-component curing adhesive of the present embodiment, occurrence of misting by the polyisocyanate composition (X) and the polyol composition (Y) can be suppressed. Consequently, even if the film transport speed is 30 m/min or more, the workability is not decreased by misting of the two-component curing adhesive. Accordingly, a laminated film can be efficiently manufactured continuously at a high film transport speed of 30 m/min or more. When the film transport speed exceeds 300 m/min, in addition to misting, a coating defect, a defect in transportation itself, a defect at the time of bonding, etc. may occur. Accordingly, the film transport speed is preferably 300 m/min or less.

The laminated film 11a obtained by the manufacturing method of the present embodiment may be, after bonding between the first film W1 and the second film W2 in the bonding unit 151 and winding by the winding unit 152, stored at ordinary temperature or under warming for 3 to 48 hours for aging as needed. The two-component curing adhesive is sufficiently cured by performing aging, and practical physical properties as an adhesive layer 10 may be expressed.

In the present embodiment, since a two-component curing adhesive in which the polyisocyanate composition (X) and the polyol composition (Y) each have a specific elongational viscosity and of which initial cohesive force is excellent is used, the time for aging can be shortened. In addition, since the initial cohesive force of the two-component curing adhesive is high, the laminated film 11a wound in the winding unit 152 can be easily processed before aging. Accordingly, the manufacturing method of the present embodiment has a wide range of choices in the manufacturing process and can improve the work efficiency.

The laminated film 11a-manufacturing apparatus 1 of the present embodiment includes a polyisocyanate coating unit 12 for applying a polyisocyanate composition (X) having an elongational viscosity of 0.1 to 10 Pa·s to a first film W1, a polyol coating unit 14 for applying a polyol composition (Y) having an elongational viscosity to a 0.1 to 10 Pa·s to a second film W2, and bonding device 15 for bonding the polyisocyanate composition (X)-coated surface of the first film W1 and the polyol composition (Y)-coated surface of the second film W2. Accordingly, the laminated film 11a-manufacturing apparatus 1 of the present embodiment can be suitably used when the laminated film 11a is manufactured by the manufacturing method of the present embodiment including a two-component separate application process using a two-component curing adhesive of the present embodiment.

In the laminated film 11a-manufacturing apparatus 1 of the present embodiment, the polyisocyanate coating unit 12 applies a polyisocyanate composition (X) having an elongational viscosity of 0.1 to 10 Pa·s to a first film W1, and the polyol coating unit 14 applies a polyol composition (Y) having an elongational viscosity of 0.1 to 10 Pa·s to a second film W2. Accordingly, in the laminated film 11a-manufacturing apparatus 1 of the present embodiment, misting of the two-component curing adhesive is unlikely to occur in the bonding device fox bonding the polyisocyanate composition (X)-coated surface of the first film W1 and the polyol composition (Y)-coated surface of the second film W2. Accordingly, the laminated film 11a can be continuously manufactured efficiently at a high film transport speed by using the laminated film 11a-manufacturing apparatus 1 of the present embodiment.

In the laminated film 11a-manufacturing apparatus 1 of the present embodiment, the occurrence of misting by the polyol composition (Y) when manufacturing the laminated film 11a can be suppressed. Consequently, as the polyol coating unit 14, a gravure coater that gives a wide range of choices in, for example, viscosity of the polyol composition (Y) may be provided, or a roll coater that is likely to cause misting of the polyol composition (Y) may be provided. Thus, choices in the polyol composition (Y) application device of the polyol coating unit 14 can be increased. When a gravure coater is selected as the polyol composition (Y) application device of the polyol coating unit 14, even if the viscosity of the polyol composition (Y) is low to cause defects, such as dripping, when a roll coater is used, dripping does not occur, and a high quality laminated film 11a having improved application quality can be manufactured. In addition, the configuration of the polyol coating unit 14 can be simplified by using a gravure coater, and the laminated film 11a-manufacturing apparatus can be miniaturized.

In the laminated film 11a-manufacturing apparatus 1 of the present embodiment, a roll coater is used in the polyisocyanate coating unit 12 that applies a polyisocyanate composition (X) having a relatively high viscosity to a first film W1. Even if the viscosity of the polyisocyanate composition (X) is relatively high, application can be performed by using a roll coater, resulting in a wider choice of materials for the polyisocyanate composition (X).

The method for manufacturing the laminated film 11a of the present embodiment includes a two-component separate application process consisting of a first application step of applying a polyisocyanate composition (X) having an elongational viscosity of 0.1 to 10 Pa·s to a first film W1 and a second application step of applying a polyol composition (Y) having an elongational viscosity of 0.1 to 10 Pa·s to a second film W2; and an adhesive layer forming process of bringing the polyisocyanate composition (X) applied on the first film W1 and the polyol composition (Y) applied on the second film W2 into contact with each other by laminating the first film W1 and the second film W2 to cause a curing reaction. Since the method for manufacturing the laminated film 11a of the present embodiment includes a two-component separate application process, a step of mixing the polyisocyanate composition (X) and the polyol composition (Y) is not necessary. Consequently, compared to the case of including a step of mixing the polyisocyanate composition (X) and the polyol composition (Y), the workability is excellent. In addition, since the polyisocyanate composition (X) and the polyol composition (Y) are not mixed, the two-component curing adhesive of the present embodiment that cures quickly can be used without being limited by the pot life of the two-component curing adhesive.

In the method for manufacturing the laminated film 11a of the present embodiment, a polyisocyanate composition (X) having an elongational viscosity of 0.1 to 10 Pa·s is applied to a first film in the first application step, and a polyol composition (Y) having an elongational viscosity of 0.1 to 10 Pa·s is applied to a second film W2 in the second application step. Consequently, according to the laminated film 11a-manufacturing method of the present embodiment, in the adhesive layer forming process by bringing the polyisocyanate composition (X) applied on the first film and the polyol composition (Y) applied on the second film into contact with each other, misting of the two-component curing adhesive is unlikely to occur, and a laminated film can be continuously manufactured efficiently at a high film transport speed.

In the above-described embodiment, a roll coater is used as the polyisocyanate coating unit 12. However, for example, when the polyisocyanate composition (X) has a low viscosity, a gravure coater may be used as the polyisocyanate coating unit 12.

In addition, in the above-described embodiment, a gravure coater is used as the polyol coating unit 14. However, a roll coater may be used as the polyol coating unit 14 when application of the polyol composition (Y) is possible.

In the polyol coating unit 14 of the laminated film 11a-manufacturing apparatus 1 of the embodiment above, although the temperature of the polyol composition (Y) stored in the coating liquid tank 144 is controlled by the temperature controller 146, the temperature of the polyol composition (Y) stored in the reservoir 142a of the chamber 142 and/or the temperature of the gravure roller 141 may also be controlled. Consequently, the viscosity of the polyol composition (Y) at the time of coating can be further stabilized, and the application quality and the quality of the laminated film 11a can be further improved.

The present embodiment has described an example of a case of manufacturing a laminated film 11a by a manufacturing method including a two-component separate application process using a laminated film 11a-manufacturing apparatus 1 including a polyisocyanate coating unit 12 for applying a polyisocyanate composition (X) to a first film W1, a polyol coating unit 14 for applying a polyol composition (Y) to a second film W2, and a bonding device 15 for bonding the first film W1 and the second film W2. However, the laminated film 11a may be manufactured by, for example, a manufacturing method including a two-component mixing application process using a manufacturing apparatus shown below.

Figure 5:
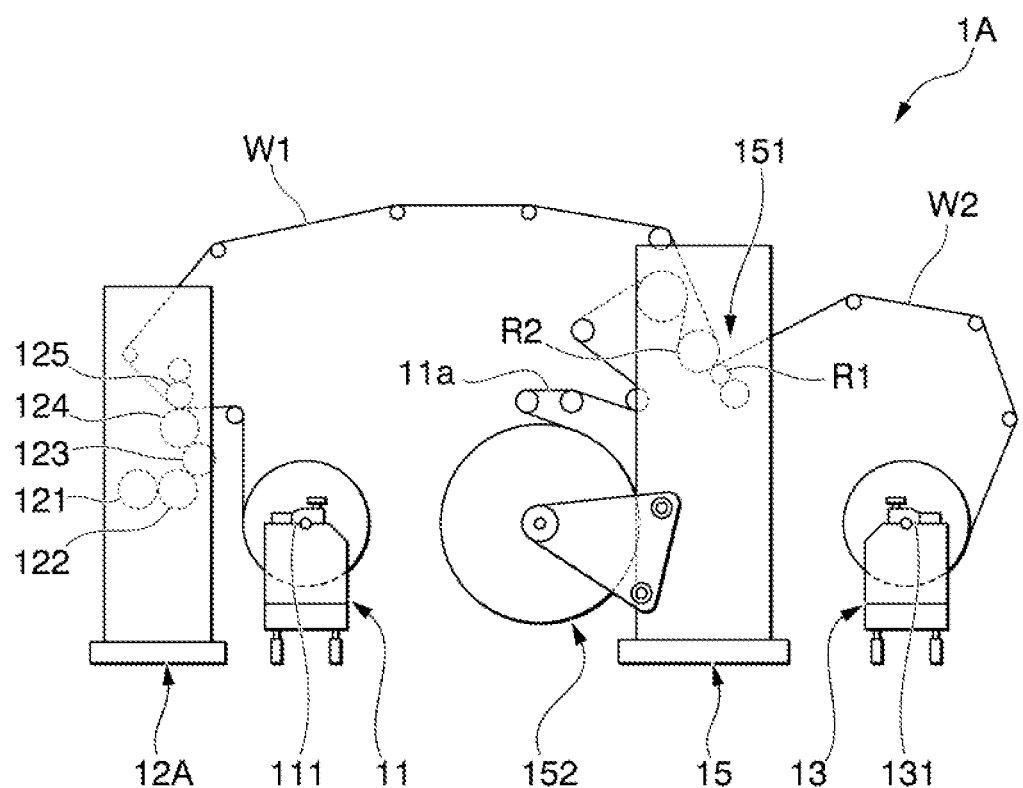
FIG. 5 is a front view for explaining another example of a manufacturing apparatus that is used for manufacturing a laminated film of the present embodiment.

FIG. 5 is a front view for explaining another example of a manufacturing apparatus that is used for manufacturing a laminated film of the present embodiment.

The laminated film-manufacturing apparatus 1A shown in FIG. 5 is an apparatus that manufactures a laminated film 11a of the above-described embodiment using the two-component curing adhesive of the above-described embodiment by bonding a first film W1 unwound from a roller and a second film W2 unwound from a roller, forming an adhesive layer 10 between the first film W1 and the second film W2, and winding it into a roll shape.

The laminated film-manufacturing apparatus 1A shown in FIG. 5 includes, as shown in FIG. 5, a first unwinding unit 11, a mixture solution coating unit 12A, a second unwinding unit 13, and a bonding device 15.

The laminated film-manufacturing apparatus 1A shown in FIG. 5 is different from the laminated film-manufacturing apparatus 1 shown in FIG. 2 only in that a mixture solution coating unit 12A is provided instead of the polyisocyanate coating unit 12 and that the polyol coating unit 14 in the laminated film-manufacturing apparatus 1 shown in FIG. 2 is not provided.

In the laminated film-manufacturing apparatus 1A shown in FIG. 5, the same members as those of the laminated film-manufacturing apparatus 1 shown in FIG. 2 are designated by the reference signs, and the description thereof will be omitted.

The mixture solution coating unit 12A in the laminated film-manufacturing apparatus 1A shown in FIG. 5 is different from the polyisocyanate coating unit 12 of the laminated film-manufacturing apparatus 1 shown in FIG. 2 in that a mixture solution of the polyisocyanate composition (X) and the polyol composition (Y) of the two-component curing adhesive of the present embodiment is applied to the first film W1 sent out from the first unwinding unit 11.

In the laminated film-manufacturing apparatus 1A shown in FIG. 5, a mixer (not shown) for mixing the polyisocyanate composition (X) and the polyol composition (Y) of the two-component curing adhesive is provided. In addition, in the laminated film-manufacturing apparatus 1A shown in FIG. 5, a mixture solution supply portion (not shown) connected to the mixture via piping is provided instead of the polyisocyanate supply portion of the laminated film-manufacturing apparatus 1 shown in FIG. 2.

As a method for manufacturing the laminated film 11a of the present embodiment using the laminated film-manufacturing apparatus 1A shown in FIG. 5, for example, the following manufacturing method can be used.

First, a first film W1 is sent out from the first unwinding unit 11 to the mixture solution coating unit 12A. In the mixture solution coating unit 12A, each roller is rotated in the direction indicated by the arrow mark in FIG. 3. Consequently, a mixture solution of the polyisocyanate composition (x) and the polyol composition (Y) stored in the liquid reservoir unit 120 is applied to the surface of the doctor roller 122.

In the present embodiment, the temperature of the mixture solution stored in the liquid reservoir unit 120 is preferably set to 25° C. to 80° C., more preferably 25° C. to 40° C., by a temperature controller (not shown).

In the present embodiment, the shear viscosity of the mixture solution at 40° C. is preferably 2,000 mPa·s or less and more preferably 1,800 mPa·s or less.

In the present embodiment, the polyol composition (Y) and the polyisocyanate composition (X) are mixed in the mixer to start the curing of the two-component curing adhesive.

The mixture solution applied to the doctor roller 122 is transferred to the metering roller 123 and the coating roller 124 sequentially. The mixture solution transferred to the coating roller 124 is transferred to the first film W1 transported between the coating roller 124 and the backing roller 125. Consequently, the mixture solution is applied to the first film W1.

In the present embodiment, the application amount of the mixture solution to be applied to the first film W1 is preferably 0.5 to 3.0 g/m$^2$ and more preferably 0.5 to 2.0 g/m$^2$.

In the mixture solution coating unit 12A, the first film W1 coated with the mixture solution is sent out to the bonding device 15 as shown in FIG. 5.

As shown in FIG. 5, the second film W2 is sent out from the second unwinding unit 13 to the bonding device 15.

In the bonding unit 151 of the bonding device 15, as shown in FIG. 5, the first film W1 and the second film W2 are sandwiched between two lamination rollers R1 and R2 disposed opposite to each other in a state in which the surface coated with the mixture solution of the first film W1 and the second film W2 are in contact with each other and pass through between the two lamination rollers R1 and R2.

The first film W1 and the second film W2 are then bonded to each other by the pressure from the two lamination rollers R1 and R2.

In the present embodiment, the temperature of the outer peripheral surfaces of the two lamination rollers R1 and R2 is preferably 40° C. to 80° C. and more preferably 40° C. to 60° C.

The pressure from the two lamination rollers R1 and R2 to the first film W1 and the second film W2 can be, for example, 3 to 300 kg/cm$^4$.

A laminated film 11a including an adhesive layer 10 between the first film W1 and the second film W2 is obtained by curing the two-component curing adhesive.

The laminated film 11a produced by bonding the first film W1 and the second film W2 in the bonding unit 151 is transported to the winding unit 152. The laminated film 11a transported to the winding unit 152 is wound by the winding unit 152.

In the laminated film 11a-manufacturing method of the present embodiment, the film transport speed (the winding speed of the laminated film 11a in the winding unit 152) when manufactures the laminated film 11a can be, for example, 30 to 300 m/min and is preferably 100 to 250 m/min. In the laminated film 11a-manufacturing method of the present embodiment, since the laminated film 11a is manufactured using the two-component curing adhesive of the present embodiment, misting by the mixture solution that is a component containing a polyol composition (Y) can be suppressed. Consequently, even if the film transport speed is 30 m/min or more, the workability is not decreased by misting of the mixture solution. Accordingly, a laminated film can be continuously manufactured efficiently at a high film transport speed of 30 m/min or more. When the film transport speed exceeds 300 m/min, in addition to misting, a coating defect, a defect in transportation itself, a defect at the time of bonding, etc. may occur. Accordingly, the film transport speed is preferably 300 m/min or less.

Since the laminated film 11a of the present embodiment is manufactured using the two-component curing adhesive of the present embodiment, even if the mixture solution that is a component containing the polyol composition (Y) is applied onto the second film W2, misting due to the polyol composition (Y) is unlikely to occur. Consequently, the laminated film 11a of the present embodiment can be efficiently manufactured using the manufacturing method including a two-component mixing application process.

The above-described embodiment has described an example of a case of manufacturing a laminated film 11a using a manufacturing method including a two-component separate application process including a step of applying only a polyol composition (Y) onto a film as a manufacturing method including a two-component separate application process. However, as the manufacturing method including a two-component separate application process, for example, the following method (1) or method (2) may be used.

(1) A mixture solution of a polyisocyanate composition and a polyol composition is applied onto a first film in a first application step, and a solution including a curing accelerator is applied to a second film in a second application step.

(2) A mixture solution of a part of a polyol composition and a polyisocyanate composition is applied onto a first film in a first application step, and a solution including the residue of the polyol composition and a curing accelerator is applied to a second film in a second application step.

EXAMPLES

The present invention will now be further specifically described by examples. Incidentally, the present invention is not limited only to the following examples. In the following examples, the "part" and "%" are based on mass, unless specified otherwise.

(Polyisocyanate Composition (X-1))
(Manufacturing of Polyisocyanate (A))

4,4-Diphenylmethane diisocyanate (hereinafter, abbreviated to "MDI"): 41.9 parts, 2,4'-MDI: 13.0 parts, and xylene diisocyanate: 0.1 parts were fed in a reaction container being a flask equipped with a stirrer, a thermometer, and a nitrogen gas introduction pipe and were stirred in a nitrogen gas and heated to 60° C. Furthermore, a bifunctional polypropylene glycol (hereinafter, abbreviated to "PPG") having a number average molecular weight of 400: 20.0 parts and a bifunctional PPG having a number average molecular weight of 2,000: 25.0 parts were dropwise added to the flask in several divided times, followed by stirring at 80° C. for 5 to 6 hours for a urethanization reaction to obtain a polyisocyanate composition (X-1) consisting of a polyisocyanate (A).

The isocyanate content of the polyisocyanate (A) was measured by a titration method using di-n-butylamine. As a result, it was 14 mass %.

In addition, the melt shear viscosity of the polyisocyanate (A) at 40° C. was measured. As a result, it was 1,500 mPa·s.

(Polyisocyanate Compositions (X-2, X-3))

As polyisocyanate compositions X-2 and X-3, the followings were prepared.

X-2: 2K-SF-220A (manufactured by DIC Corporation), isocyanate content (14 mass %), and X-3: 2K-SF-700A (manufactured by DIC Corporation), isocyanate content (21 mass %).

(Polyol compositions (Y-1) to (Y-6))

Polyol compositions (Y-1) to (Y-6) were prepared by mixing polyol (B) and polyamine (C) shown in Table 1 at the proportions shown in Table 1.

TABLE 1

|  |  | Hydroxy value Amine value (mgKOH/g) | Y-1 | Y-2 | Y-3 | Y-4 | Y-5 | Y-6 |
|---|---|---|---|---|---|---|---|---|
| Polyol (B) (part by mass) | Castor oil | 160 | 73.3 |  | 70.0 | 70.0 | 70.0 | 70.0 |
|  | D 1000 | 112 | 18.3 | 76.8 | 15.8 | 20.7 | 16.75 | 15.5 |
|  | TE-360 | 520 |  | 18.2 |  |  |  |  |
|  | EXCENOL430 | 400 |  |  | 6.6 |  | 6.6 | 7.5 |
|  | EDP300 | 750 | 6.6 |  |  | 4.4 |  |  |
| Polyamine (C) (part by mass) | EC310 | 350 |  |  | 6.6 | 4.4 | 6.6 | 6.8 |

TABLE 1-continued

| | | Hydroxy value Amine value (mgKOH/g) | Y-1 | Y-2 | Y-3 | Y-4 | Y-5 | Y-6 |
|---|---|---|---|---|---|---|---|---|
| Additive (part by mass) | ε-caprolactam | 0 | | 0.9 | | 1.0 | 0.5 | |
| | δ-valerolactam | 0 | | | 5.0 | | | |
| | DBTDL | 0 | | | | | 0.05 | |
| | Bi-Zn | 0 | | | | | | 0.2 |
| | OFS-6040 | 0 | | 0.6 | | | | |
| | KBM-903 | 0 | | 0.3 | | | | |
| | Total | | 100.0 | 100.0 | 100.0 | 100.0 | 100.0 | 100.0 |
| | Sum of hydroxy and amine values (mgKOH/g) | | 187.3 | 180.7 | 179.2 | 183.6 | 180.3 | 183.2 |

Abbreviations in Table 1 are as follows.

"Polyol (B)"

Castor oil: Fine castor oil (manufactured by Itoh Oil Chemicals Co., Ltd., hydroxy value: 160 mg KOH/g, 40° C. melt shear viscosity: 250 mPa·s)

D-1000: polypropylene glycol (manufactured by Mitsui Chemicals Polyurethanes, Inc., number average molecular weight: about 1,000, hydroxy value: 11.2 mg KOH/g, 40° C. melt shear viscosity: 150 mPa·s), Actcol D-1000

TE-360: triethanolamine propoxylated

EXCENOL 430: polypropylene glycol (manufactured by AGC Inc., functional group: 3, number average molecular weight: about 430, hydroxy value: 400 mg KOH/g, 25° C. melt shear viscosity: 350 mPa·s)

EDP-300: N,N,N',N'-tetrakis(2 hydroxypropyl)ethylenediamine (manufactured by ADEKA Corporation)

"Polyamine (C)"

EC310: polyoxypropylene polyamine (manufactured by BASF SE), Baxxdur EC310

"Catalyst"

ε-Caprolactam: 2-oxohexamethyleneimine (manufactured by Kanto Chemical Co., Ltd.)

δ-Valerolactam: tetrahydro-2H-pyran-2-one (manufactured by Kanto Chemical Co., Ltd.)

DBTDL: dibutyl tin dilaurate (manufactured by Nitto Kasei Co., Ltd.), Neostann U-100

Bi—Zn: catalyst mixture of bismuth neodecanoate and zinc neodecanoate (manufactured by The Shepherd Chemical Company) Bicat 8108/Z Mixture "Adhesion Promoter"

OFS-6040: 3-glycidyloxypropyltrimethoxysilane (manufactured by DuPont Toray Specialty Materials K.K.)

KBM-903: 3-aminopropyltriethoxysilane (manufactured by Shin-Etsu Chemical Co., Ltd.)

(Polyol compositions (Y-7) and (Y-8))

As polyol components Y-7 and Y-8, the followings were prepared.

Y-7: HA-234B (manufactured by DIC Corporation), hydroxy value: 90 mg KOH/g

Y-8: HA-700B (manufactured by DIC Corporation), hydroxy value: 120 mg KOH/g

The hydroxy values or amine values of the materials used in polyol compositions (Y-1) to (Y-8) were determined by the following methods.

The hydroxy value was determined in accordance with the hydroxy value measurement method of JIS-K0070.

The amine value was determined in accordance with the amine value standard testing method of ASTM D2073.

The sum of the hydroxy value and the amine value included in each of polyol compositions (Y-1) to (Y-8) was then determined. The results are shown in Tables 1 and 2.

Regarding the polyisocyanate compositions (X-1) to (X-3) and the polyol compositions (Y-1) to (Y-8), the elongational viscosity at an elongation rate of 4,000 s$^{-1}$ was measured by the following method. The results are shown in Table 2.

The elongational viscosity was measured in accordance with the capillary rheometer evaluation method described in JIS-7199 (ISO 11443, ASTM D 3835).

Specifically, the true shear viscosity was obtained by measuring an apparent shear viscosity (pressure) using a twin capillary-type apparatus (manufactured by Goettfert Inc., RHEOGRAPH 20) and using a capillary die having a length of 10 mm and a diameter of 0.5 mm and a capillary die having a length of 0.25 mm and a diameter of 0.5 mm at a temperature of 40° C. and a shear rate of 1,000 to 300,000 s and performing Bargley correction to remove the pressure loss. The elongational viscosity corresponding to the elongation rate was determined using a Cogswell model from the true shear viscosity and the pressure loss.

"Examples 1 to 7 and Comparative Examples 1 to 3"

The polyisocyanate compositions (X-1) to (X-3) and the polyol compositions (Y-1) to (Y-8) were used at the proportions shown in Table 2, and laminated films of Examples 1 to 7 and Comparative Examples 1 to 3 were produced by the method shown below using the manufacturing apparatus shown in FIGS. 2 to 4 at film transport speeds of 100, 1.50, 200, and 250 m/min.

TABLE 2

| | | Functional group amount | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|---|
| Polyisocyanate composition (part by mass) | X-1 | 14.0 | 100 | 100 | 100 | 100 | 100 | 100 | | | 100 | |
| | X-2 | 14.0 | | | | | | | 100 | | | |
| | X-3 | 21.0 | | | | | | | | 100 | | 100 |
| Polyol composition (part by mass) | Y-1 | 187.3 | 70 | | | | | | | | | |
| | Y-2 | 180.7 | | 70 | | | | | | | | |
| | Y-3 | 179.2 | | | 70 | | | | | | | |

TABLE 2-continued

| | Functional group amount | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Y-4 | 183.6 | | | | 70 | | | | | | |
| Y-5 | 180.3 | | | | | 70 | | | | | |
| Y-6 | 183.2 | | | | | | 70 | | | | |
| Y-7 | 90.0 | | | | | | | 140 | 200 | | |
| Y-8 | 120.0 | | | | | | | | | 100 | 150 |
| NCO excess ratio | | 1.43 | 1.48 | 1.49 | 1.45 | 1.48 | 1.46 | 1.48 | 1.56 | 1.56 | 1.56 |
| X-1 to X-3: 40° C., 4,000/s Elongational viscosity (Pa · s) | | 8.75 | 8.75 | 8.75 | 8.75 | 8.75 | 8.75 | 29.2 | 8.75 | 8.75 | 29.2 |
| Y-1 to Y-8 40° C., 4,000/s Elongational viscosity (Pa · s) | | 0.67 | 0.52 | 0.47 | 0.74 | 0.88 | 0.52 | 3.55 | 3.55 | 14.0 | 14.0 |
| Misting property evaluation Coating speed: m/min | 100 | 4 | 4 | 4 | 4 | 4 | 4 | 4 | 3 | 2 | 2 |
| | 150 | 4 | 4 | 4 | 4 | 4 | 4 | 4 | 2 | 2 | 1 |
| | 200 | 4 | 4 | 4 | 4 | 4 | 4 | 4 | 1 | 1 | 1 |
| | 250 | 4 | 4 | 4 | 4 | 4 | 4 | 4 | 1 | 1 | 1 |
| Inital cohesive force evaluation | 3 hours | 4 | 4 | 4 | 4 | 4 | 4 | 4 | 1 | 1 | 1 |
| | 6 hours | 4 | 4 | 4 | 4 | 4 | 4 | 4 | 1 | 1 | 1 |
| | 12 hours | 4 | 4 | 4 | 4 | 4 | 4 | 4 | 1 | 1 | 1 |
| | 24 hours | 4 | 4 | 4 | 4 | 4 | 4 | 4 | 1 | 2 | 2 |

In Table 2, the proportions of the polyisocyanate compositions (X-1) to (X-3) and the polyol compositions (Y-1) to (Y-8) were determined such that the molar ratio of the isocyanate groups possessed by the polyisocyanate compositions (X-1) to (X-3) to the sum of the hydroxy value and the amine value of the polyol compositions (Y-1) to (Y-8) [isocyanate group/(hydroxy value+amine value)] were within a range of 1.4 to 1.6. In Table 2, the molar ratio is shown as an NCO excess ratio.

The functional group amounts of the polyisocyanate compositions shown in Table 2 are isocyanate contents (%) of the polyisocyanate compositions (X-1) to (X-3). The functional group amounts of the polyol compositions shown in Table 2 are each the sum (mg KOH/g) of the hydroxy value and the amine value of the polyol composition.

Any of the polyisocyanate compositions (X-1) to (X-3) was applied to the corona treated surface of a one side corona treated PET film (first film) having a thickness of 12 μm with a roll coater (first application step). The first application step was performed by adjusting the temperature of the polyisocyanate composition (X) stored in the coating liquid tank to 40° C.

Simultaneously with the first application step, any of the polyol compositions (Y-1) to (Y-8) was applied to the aluminum vapor deposited surface of an aluminum vapor deposited polypropylene (VMCPP) film (second film) having a thickness of 25 μm with a gravure coater (second application step).

The first application step and the second application step were performed such that the total application amount of the polyisocyanate compositions (X-1) to (X-3) and the polyol compositions (Y-1) to (Y-8) was 2.0 g/m².

The first coating unit and the second coating unit were visually verified during the application in the first application step and the second application step, and misting properties were evaluated based on the criteria described later.

The adhesive layer forming process was then performed continuously from the first application step and the second application step. The adhesive layer forming process was performed by laminating the first film and the second film to bring any of the polyisocyanate compositions (X-1) to (X-3) applied on the first film and any of the polyol compositions (Y-1) to (Y-8) applied on the second film into contact with each other and to cause a curing reaction.

The laminated films of Examples 1 to 7 and Comparative Examples 1 to 3 manufactured at a film transport speed of 100, 150, 200, or 250 m/min were evaluated for the misting properties in the first application step and the second application step based on the following criteria, and 3 or above was judged to be acceptable. The results are shown in Table 2.

(Misting Property Evaluation)
4: Misting does not occur in both the first coating unit and the second coating unit;
3: Misting slightly occurs in both the first coating unit and the second coating unit;
2: Misting occurs in both the first coating unit and the second coating unit; and
1: Misting severely occurs in both the first coating unit and the second coating unit.

The shear strengths of the laminated films of Examples 1 to 7 and Comparative Examples 1 to 3 manufactured at a film transport speed of 200 m/min were measured for evaluation of the initial cohesive force by the following method. The shear strengths were measured at 3 hours, 6 hours, 12 hours, and 24 hours after the completion of the adhesive layer forming process at an atmospheric temperature of 25° C. The results are shown in Table 2.

(Method for Measuring Shear Strength)
The laminated film was cut in a strip form having a width of 10 mm and a length of 200 mm, and only the first film was cut in the width direction from the surface on the first film side. Subsequently, only the second film was cut in the width direction from the surface on the second film side of the laminated film at a position 10 mm spaced from the cutting position of the first film in the length direction in a planar view. Consequently, a test piece having an adhesive layer of a plane area of 100 mm² between the cutting position of the first film and the cutting position of the second film was obtained.

One end of the obtained test piece in the length direction was held with a clamp, and the other end was pulled in the length direction at a tensile speed of 5 mm/min using a tensile tester (Autograph AGS-J, manufactured by Shimadzu Corporation), and the shear strength was measured.

(Initial Cohesive Force Evaluation)
The shear strength was evaluated based on the following criteria, and 5 N/10 mm or more (3 or above), shortening the aging time, was judged to be acceptable.

1: less than 1 N/10 mm,
2: 1 N/10 mm or more and less than 5 N/10 mm,
3: 5 N/10 mm or more and less than 10 N/10 mm, and
4: 10 N/10 mm or more.

As shown in Table 2, in Examples 1 to 7 in which the polyisocyanate composition (X) and the polyol composition (Y) each had an elongational viscosity of 0.1 to 10 Pa·s, misting did not occur even at a high film transport speed of 250 m/min, and good workability was maintained.

In contrast, in Comparative Example 1 in which the polyisocyanate composition (X) had an elongational viscosity of above 10 Pa·s and in Comparative Example 2 in which the polyol composition (Y) had an elongational viscosity of above 10 Pa·s, misting slightly occurred even at a film transport speed of 100 m/min. In Comparative Example 3 in which the polyisocyanate composition (X) and the polyol composition (Y) each had an elongational viscosity of above 10 Pa·s, misting occurred even at a film transport speed of 100 m/min.

These results confirmed that occurrence of misting can be suppressed when the polyisocyanate composition (X) and the polyol composition (Y) each have an elongational viscosity of 0.1 to 10 Pa·s to provide good workability. Consequently, it was demonstrated that the production efficiency can be improved by that the elongational viscosities of the polyisocyanate composition (X) and the polyol composition (Y) are each 0.1 to 10 Pa·s.

As obvious from the Table 2, in Examples 1 to 7, a high shear strength of 10 N/10 mm or more could be obtained even at 3 hours after the completion of the adhesive layer forming process. This demonstrates that in Examples 1 to 7, after the completion of the adhesive layer forming process, the shear strength rises at an early stage, and a high initial cohesive force is observed.

In contrast, in Comparative Example 1, the shear strength was less than 1 N/10 mm even at 24 hours after the completion of the adhesive layer forming process. In Comparative Example 2, the shear strength was less than 10 N/10 mm even at 12 hours after the completion of the adhesive layer forming process. In Comparative Example 3, the shear strength was less than 5 N/1.0 mm even at 24 hours after the completion of the adhesive layer forming process. Consequently, it was demonstrated that in Comparative Examples 1 to 3, the shear strength does not rise at an early stage, and the initial cohesive force is inferior compared to Examples 1 to 7.

From the above, the laminated film obtained using the two-component curing adhesive of the present invention is excellent in initial cohesive force, is unlikely to cause misting during the manufacturing thereof, has excellent characteristics, and can be efficiently manufactured.

REFERENCE SIGNS LIST 1 laminated film-manufacturing apparatus
10 adhesive layer
11 first unwinding unit
11a laminated film
12 polyisocyanate coating unit (first coating unit)
13 second unwinding unit
14 polyol coating unit (second coating unit)
15 bonding device
111 film mounting unit
120 liquid reservoir unit
12.1 application roller
122 doctor roller
123 metering roller
124 coating roller
125 backing roller
126 weir plate
131 film mounting unit
141 gravure roller
142 chamber
142a reservoir
142b doctor blade
142c seal plate
142d side plate
143 impression drum
144 coating liquid tank
145 pump
146 temperature controller
151 bonding unit
152 winding unit
R1, R2 lamination roller
W1 first film
W2 second film

The invention claimed is:

1. A two-component curing adhesive comprising a polyisocyanate composition (X) and a polyol composition (Y), wherein
the polyisocyanate composition (X) includes a polyisocyanate (A),
the polyol composition (Y) includes a polyol (B) and a polyamine (C),
the polyamine (C) includes a compound having two or more —$NH_2$ groups in a molecule thereof, and
the polyisocyanate composition (X) and the polyol composition (Y) each have an elongational viscosity of 0.1 to 10 Pa·s as measured at an elongation rate of 4,000 $s^{-1}$ in accordance with the capillary rheometer evaluation method described in JIS-7199.

2. A laminated film comprising an adhesive layer between a first film and a second film, wherein
the adhesive layer is made of a cured product of the two-component curing adhesive according to claim 1.

3. A laminated film-manufacturing apparatus comprising:
a first coating unit for applying a polyisocyanate composition (X) including a polyisocyanate (A) and having an elongational viscosity of 0.1 to 10 Pa·s as measured at an elongation rate of 4,000 $s^{-1}$ in accordance with the capillary rheometer evaluation method described in JIS-7199 to a first film;
a second coating unit for applying a polyol composition (Y) including a polyol (B) and a polyamine (C) and having an elongational viscosity of 0.1 to 10 Pa·s as measured at an elongation rate of 4,000 $s^{-1}$ in accordance with the capillary rheometer evaluation method described in JIS-7199 to a second film, the polyamine (C) including a compound having two or more —$NH_2$ groups in a molecule thereof; and
a bonding device for bonding the polyisocyanate composition (X)-coated surface of the first film and the polyol composition (Y)-coated surface of the second film.

4. A method for manufacturing a laminated film, comprising:
a two-component separate application process composed of a first application step of applying a polyisocyanate composition (X) including a polyisocyanate (A) and having an elongational viscosity of 0.1 to 10 Pa·s as measured at an elongation rate of 4,000 $s^{-1}$ in accordance with the capillary rheometer evaluation method described in JIS-7199 to a first film, and
a second application step of applying a polyol composition (Y) including a polyol (B) and a polyamine (C) and having an elongational viscosity of 0.1 to 10 Pa·s as measured at an elongation rate of 4,000 s$^{-1}$ in accordance with the capillary rheometer evaluation method described in JIS-7199 to a second film, the polyamine (C) including a compound having two or more —NH$_2$ groups in a molecule thereof; and an adhesive layer forming process of bringing the polyisocyanate composition (X) applied on the first film and the polyol composition (Y) applied on the second film into contact with each other by laminating the first film and the second film to cause a curing reaction.

5. The two-component curing adhesive according to claim 1, wherein the compound having two or more —NH$_2$ groups in a molecule thereof is methylenediamine, ethylenediamine, isophoronediamine, 3,9-dipropaneamine-2,4,8,10-tetraoxaspiro undecane, lysine, phenylenediamine, 2,2,4-trimethylhexamethylenediamine, tolylenediamine, hydrazine, hexamethylenediamine, propylenediamine, dicyclohexylmethane-4,4-diamine, 2-hydroxyethylethylenediamine, di-2-hydroxyethylethylenediamine, di-2-hydroxyethylpropylenediamine, poly(propylene glycol)diamine, poly(propylene glycol)triamine, poly(propylene glycol)tetraamine, 1,2-diaminopropane, and 1,3-diaminopropane; 1,4-diaminobutane, 1,5-diaminopentane, 1,6-diaminohexane, 1,7-diaminoheptane, 1,8-diaminooctane, 1,9-diaminononane, 1,10-diaminodecane, benzylamine, diethylenetriamine, dipropylenetriamine, triethylenetetramine, tripropylenetetramine, tetraethylenepentamine, tetrapropylenepentamine, pentaethylenehexamine, nonaethylenedecamine, trimethylhexamethylenediamine, tetra(aminomethyl)methane, tetrakis(2-aminoethylaminomethyl) methane, 1,3-bis(2'-aminoethylamino)propane, triethylenebis(trimethylene)hexamine, bis(3-aminoethyl)amine, bishexamethylenetriamine, 1,4-cyclohexanediamine, 4,4'-methylenebiscyclohexylamine, 4,4'-isopropylidenebiscyclohexylamine, and norbornadiamine; bis(aminomethyl)cyclohexane, diaminodicyclohexylmethane, isophoronediamine, mensendiamine, bis(aminoalkyl)benzene, ortho-xylenediamine, meta-xylenediamine, para-xylenediamine, phenylenediamine, naphthylenediamine, diaminodiphenylmethane, diaminodiethylphenylmethane, 2,2-bis(4-aminophenyl)propane, 4,4'-diaminodiphenyl ether, 4,4'-diaminobenzophenone, 4,4'-diaminodiphenyl ether, 4,4'-diaminodiphenyl sulfone, 2,2'-dimethyl-4,4'-diaminodiphenylmethane, 2,4'-diaminobiphenyl, 2,3'-dimethyl-4,4'-diaminobiphenyl, 3,3'-dimethoxy-4,4'-diaminobiphenyl, morpholine, 1,4-bis-(8-aminopropyl)-piperazine, piperazine-1,4-diazacycloheptane, 1-(2'-aminoethylpiperazine), 1-[2'-(2''-aminoethylamino)ethyl] piperazine, tricyclodecanediamine, or polyoxypropylene polyamine.

6. The two-component curing adhesive according to claim 1, wherein the polyol (B) comprises a polyester polyol selected from the groups consisting of castor oil, succinic acid, adipic acid, azelaic acid, sebacic acid, dodecanedicarboxylic acid, maleic anhydride, fumaric acid, 1,3-cyclopentanedicarboxylic acid, and 1,4-cyclohexanedicarboxylic acid; aromatic dicarboxylic acids, such as terephthalic acid, isophthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid; anhydrides, p-hydroxybenzoic acid, p-(2-hydroxyethoxy)benzoic acid and dimer acid.

7. The two-component curing adhesive according to claim 1, wherein the polyol (B) comprises a trifunctional or tetrafunctional aliphatic alcohol selected from the groups consisting of glycerol, trimethylolpropane, pentaerythritol; bisphenols, dimer diol; ethylene oxide, propylene oxide, butylene oxide, styrene oxide, epichlorohydrin, tetrahydrofuran, and cyclohexylene.

8. The two-component curing adhesive according to claim 1, wherein the polyol comprises a glycol selected from the groups consisting of ethylene glycol, propylene glycol, 1,3-propanediol, 1,4-butanediol, 1,5-pentanediol, 3-methyl-1,5-pentanediol, 1,6-hexanediol, neopentyl glycol, methyl pentanediol, dimethyl butanediol, butyl ethyl propanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, and triethylene glycol.

9. The two-component curing adhesive according to claim 1, wherein the polyol (B) has a hydroxy value of 50 mg KOH/g or more and 300 mg KOH/g or less.

10. The two-component curing adhesive according to claim 9, wherein the polyol (B) has a total sum of hydroxy and amine values of 179.2 mg KOH/g or more and 187.3 mg KOH/g or less.

11. The two-component curing adhesive according to claim 1, wherein elongational viscosity of the polyisocyanate composition (X) is 3 Pa·s or more and 10 Pa·s or less.

12. The two-component curing adhesive according to claim 1, wherein the elongational viscosity of the polyol composition (Y) is 0.1 Pa·s or more and 7 Pa·s or less.

* * * * *